United States Patent
Adebar

(10) Patent No.: US 12,472,328 B2
(45) Date of Patent: Nov. 18, 2025

(54) SYSTEMS AND METHODS FOR DETERMINING BUCKLING AND PATIENT MOVEMENT DURING A MEDICAL PROCEDURE

(71) Applicant: Intuitive Surgical Operations, Inc., Sunnyvale, CA (US)

(72) Inventor: Troy K. Adebar, Mountain View, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 923 days.

(21) Appl. No.: 17/437,153

(22) PCT Filed: Mar. 12, 2020

(86) PCT No.: PCT/US2020/022238
§ 371 (c)(1),
(2) Date: Sep. 8, 2021

(87) PCT Pub. No.: WO2020/190605
PCT Pub. Date: Sep. 24, 2020

(65) Prior Publication Data
US 2022/0143366 A1 May 12, 2022

Related U.S. Application Data

(60) Provisional application No. 62/818,920, filed on Mar. 15, 2019.

(51) Int. Cl.
*A61M 25/01* (2006.01)

(52) U.S. Cl.
CPC . *A61M 25/0116* (2013.01); *A61M 2025/0166* (2013.01)

(58) Field of Classification Search
CPC ....... A61M 25/0116; A61M 2025/0166; A61B 2034/301; A61B 2090/0807; A61B 1/2676
See application file for complete search history.

(56) References Cited

U.S. PATENT DOCUMENTS

| 6,380,732 B1 | 4/2002 | Gilboa |
| 6,389,187 B1 | 5/2002 | Greenaway et al. |

(Continued)

FOREIGN PATENT DOCUMENTS

| WO | WO-2018009841 A1 | 1/2018 | |
| WO | WO-2018057633 A1 | 3/2018 | |
| WO | WO-2019036456 A2 * | 2/2019 | ............. A61B 34/10 |

OTHER PUBLICATIONS

International Search Report and Written Opinion for Application No. PCT/US2020/022238, mailed Jun. 9, 2020, 20 pages.

(Continued)

*Primary Examiner* — Oommen Jacob
(74) *Attorney, Agent, or Firm* — Haynes & Boone, LLP.

(57) ABSTRACT

A medical system comprises an elongate instrument and a control system. The control system is adapted to generate a first model of the elongate instrument and generate a second model of the elongate instrument based at least in part on a reference pose of the elongate instrument. The control system is further adapted to compare the first model with the second model and determine a difference between the first model and the second model. The control system is further adapted to characterize the difference between the first model and the second model and determine a state of instrument buckling based on the characterization of the difference between the first model and the second model.

20 Claims, 13 Drawing Sheets

(56) References Cited

U.S. PATENT DOCUMENTS

| | | |
|---|---|---|
| 7,416,681 B2 | 8/2008 | Kim et al. |
| 10,706,543 B2* | 7/2020 | Donhowe ............... G06T 7/344 |
| 2006/0013523 A1 | 1/2006 | Childlers et al. |
| 2008/0212082 A1 | 9/2008 | Froggatt et al. |
| 2009/0220132 A1* | 9/2009 | Trousset ................... G06T 7/33 |
| | | 382/128 |
| 2010/0082041 A1 | 4/2010 | Prisco |
| 2012/0289777 A1 | 11/2012 | Chopra et al. |
| 2013/0096377 A1 | 4/2013 | Duindam et al. |
| 2013/0204124 A1 | 8/2013 | Giuseppe |
| 2013/0211244 A1* | 8/2013 | Nathaniel ............... A61B 34/20 |
| | | 600/424 |
| 2018/0177383 A1 | 6/2018 | Noonan et al. |
| 2018/0318550 A1* | 11/2018 | Chiu ..................... A61M 5/142 |
| 2019/0192138 A1* | 6/2019 | Shelton, IV ....... A61B 17/3462 |
| 2019/0192150 A1* | 6/2019 | Widenhouse ...... A61B 17/3403 |
| 2019/0192151 A1* | 6/2019 | Shelton, IV ......... A61B 17/068 |
| 2019/0254846 A1* | 8/2019 | Gianotti ................... A61F 2/90 |
| 2020/0297442 A1* | 9/2020 | Adebar .................. A61B 34/30 |
| 2022/0143366 A1* | 5/2022 | Adebar ................ A61B 1/0016 |

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

International Preliminary Report on Patentability for Application No. PCT/US2020/022238, mailed on Sep. 30, 2021, 12 pages.

\* cited by examiner

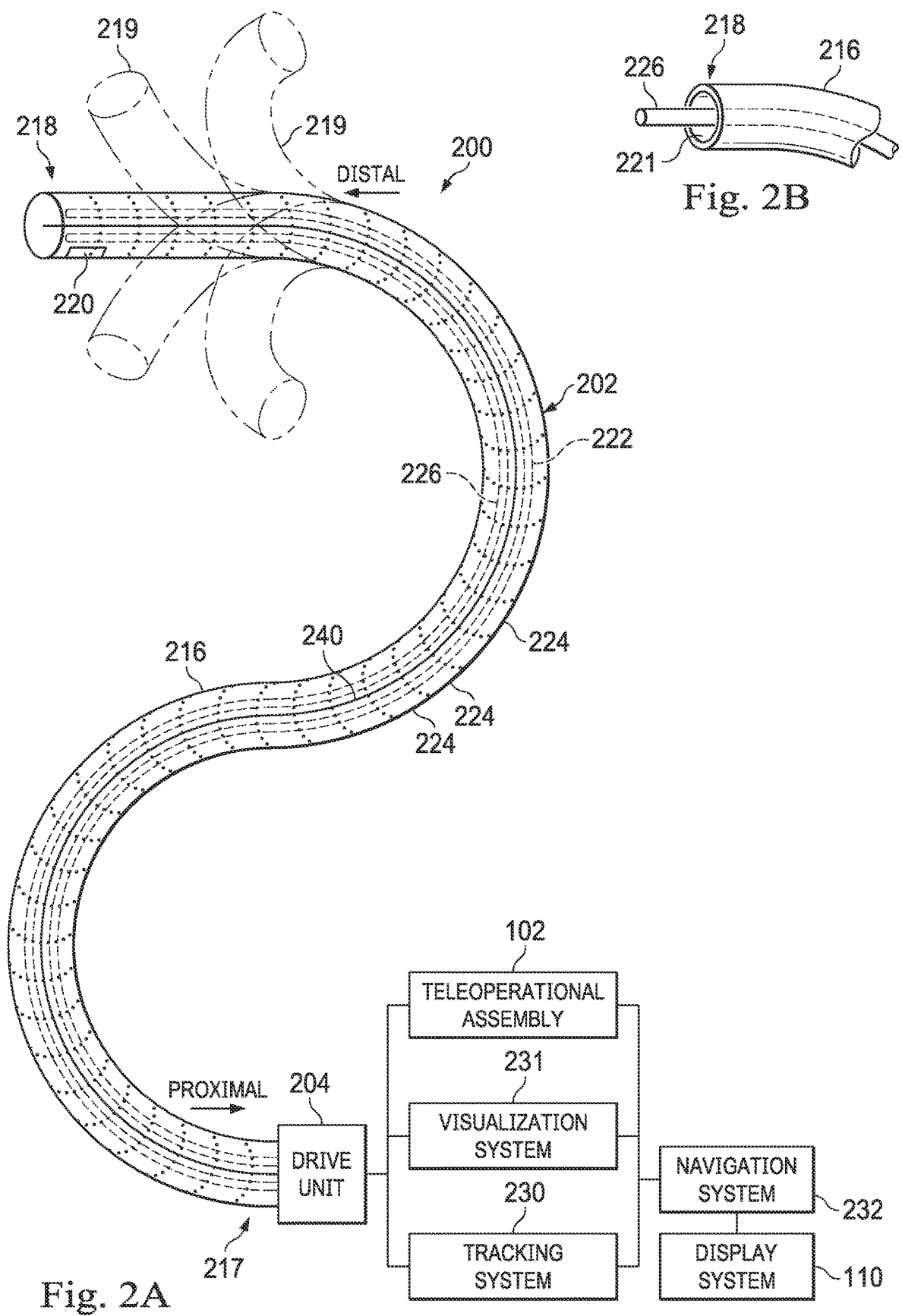

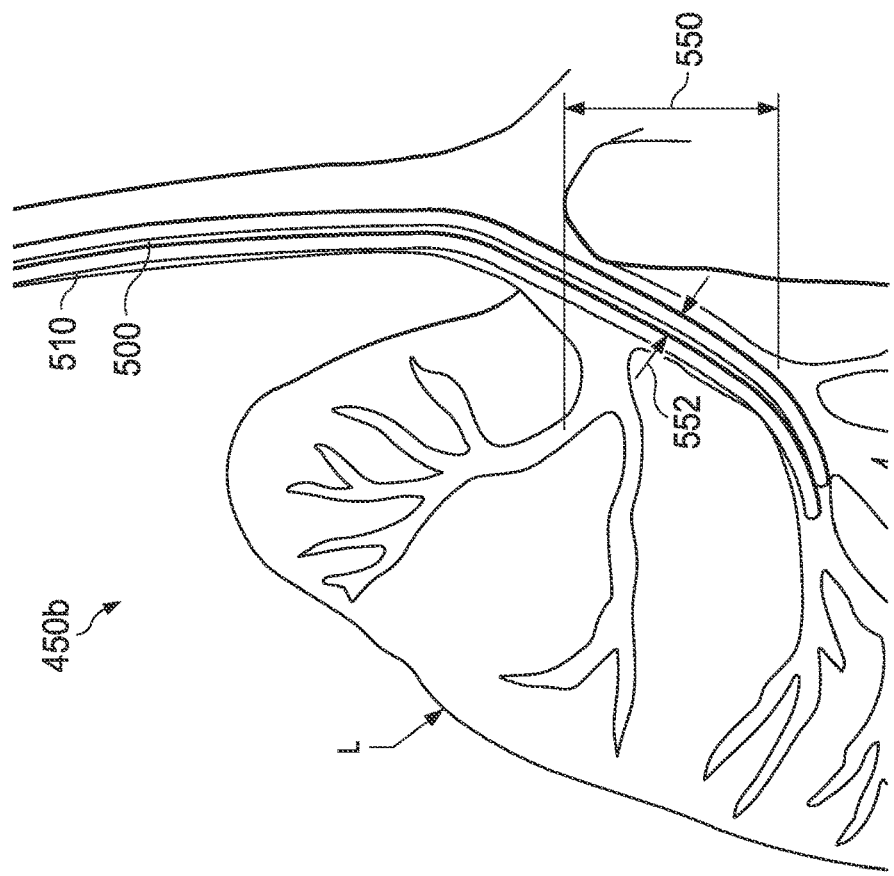
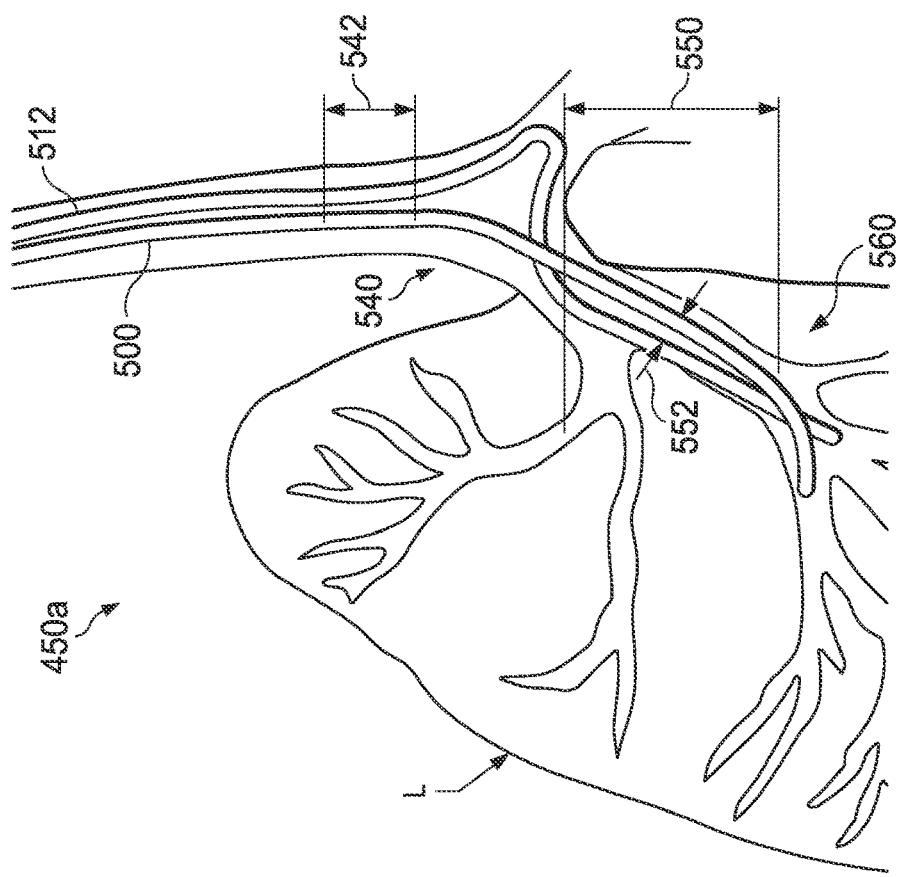

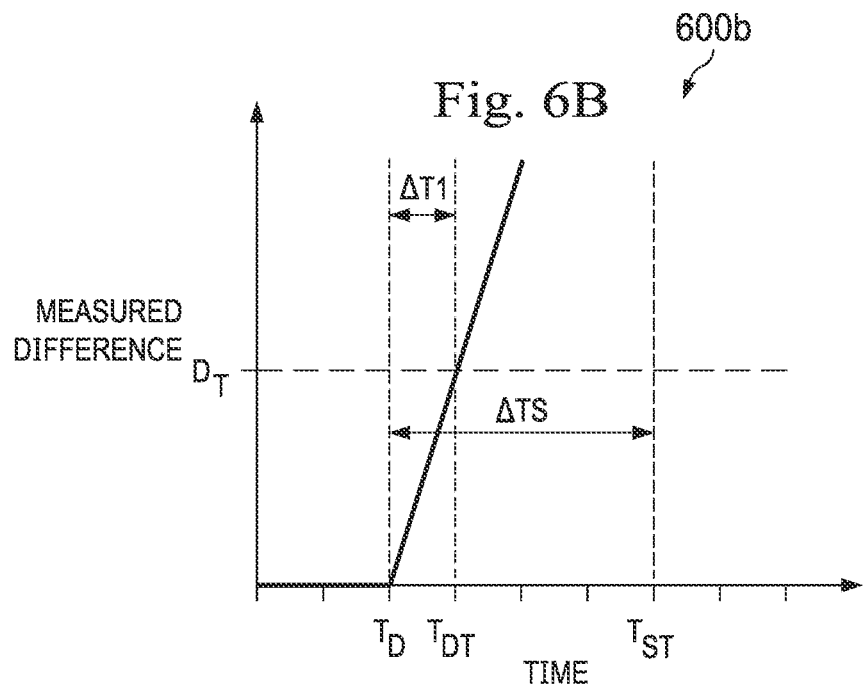
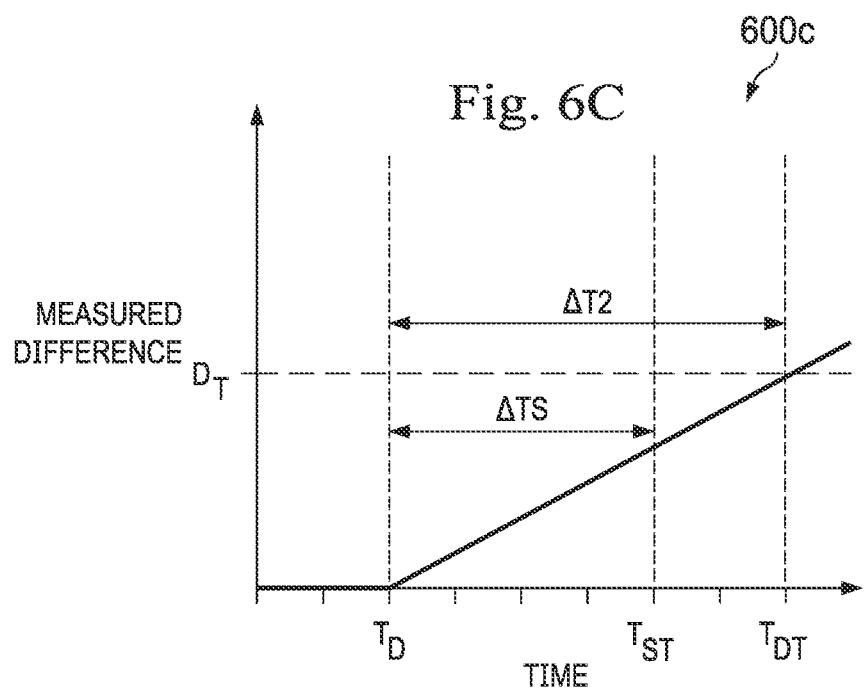

SYSTEMS AND METHODS FOR DETERMINING BUCKLING AND PATIENT MOVEMENT DURING A MEDICAL PROCEDURE

CROSS-REFERENCE TO RELATED APPLICATIONS

This application is a U.S. National Stage patent application of International Patent Application No. PCT/US2020/022238, filed Mar. 12, 2020, which claims priority to and the benefit of U.S. Provisional Patent Application No. 62/818,920, filed Mar. 15, 2019, all of which are incorporated by reference herein in their entirety.

FIELD

The present disclosure is directed to systems and methods for monitoring buckling of an elongate instrument and the motion of a patient or of a medical system relative to the patient during a medical procedure.

BACKGROUND

Minimally invasive medical techniques are intended to reduce the amount of tissue that is damaged during medical procedures, thereby reducing patient recovery time, discomfort, and harmful side effects. Such minimally invasive techniques may be performed through natural orifices in a patient anatomy or through one or more surgical incisions. Through these natural orifices or incisions a physician may insert minimally invasive medical tools to reach a target tissue location. Minimally invasive medical tools include instruments such as therapeutic, diagnostic, biopsy, and surgical instruments. One such minimally invasive technique is to use a flexible and/or steerable elongate device, such as a flexible catheter, that can be inserted into anatomic passageways and navigated toward a region of interest within the patient anatomy. Other minimally invasive techniques may include the use of relatively rigid devices manipulated within the patient anatomy. Control of such an elongate device involves the management of several degrees of freedom including at least the management of insertion and retraction of the elongate device as well as steering of the device.

During a medical procedure, the patient may move, and/or the minimally invasive medical tool may buckle, especially if the medical tool is flexible. For example, an involuntary bodily movement may occur, such as respiration or cardiac movement, a voluntary bodily movement may occur where the patient moves, or the patient may be bumped or otherwise moved by a physician or another person present in the surgical environment. Additionally, the minimally invasive system may be accidentally moved relative to the patient. In other examples, a portion of the elongate device may buckle during insertion of the instrument. Such patient movements and elongate device buckling can cause complications during the minimally-invasive procedures, including image-guided medical procedures.

Accordingly, it would be advantageous to provide improved methods and systems for monitoring patient motion and instrument buckling during a medical procedure. It would also be advantageous to provide improved methods and systems for determining whether any changes in the minimally invasive system during the medical procedure are the result of patient motion or instrument buckling.

SUMMARY

The embodiments of the invention are best summarized by the claims that follow the description.

Consistent with some embodiments, a method performed by a control system is provided. The method includes generating a first model of an elongate instrument. The method further includes generating a second model of the elongate instrument based at least in part on a reference pose of the elongate instrument. The method further includes comparing the first model with the second model. The method further includes determining a difference between the first model and the second model. The method further includes characterizing the difference between the first model and the second model. The method further includes determining a state of instrument buckling based on the characterization of the difference between the first model and the second model.

Consistent with other embodiments, a medical system is provided. The system includes an elongate instrument having a sensor system. The sensor system includes one or more sensors for measuring a shape of the elongate instrument. The system further includes a control system in communication with the sensor system. The control system is adapted to generate a first model of the elongate instrument. The control system is further adapted to generate a second model of the elongate instrument based at least in part on a reference pose of the elongate instrument. The control system is further adapted to compare the first model with the second model. The control system is further adapted to determine a difference between the first model and the second model. The control system is further adapted to characterize the difference between the first model and the second model. The control system is further adapted to determine a state of a system configuration based on the characterization of the difference between the first model and the second model.

Consistent with other embodiments, a method performed by a control system is provided. The method includes generating a first model of an elongate instrument. The method further includes generating a second model of the elongate instrument based at least in part on a reference pose of the elongate instrument. The method further includes comparing the first model with the second model. The method further includes determining a first time when the comparison of the first model with the second model indicates a deviation from the second model. The method further includes determining a second time when the comparison of the first model with the second model meets or exceeds a threshold difference between the first model and the second model. The method further includes determining a measured time interval between the first time and the second time. The method further includes determining, based on the measured time interval, a state of a system configuration.

Consistent with other embodiments, a method performed by a control system is provided. The method includes generating a first model of an elongate instrument. The method further includes generating a second model of the elongate instrument based at least in part on a reference pose of the elongate instrument. The method further includes detecting that the first model differs from the second model by at least a threshold difference. The method further includes correlating the detected difference between the first model and the second model with a received insertion command. The method further includes determining, based on the correlation, a state of a system configuration.

Consistent with other embodiments, a method performed by a control system is provided. The method includes generating a first model of an elongate instrument. The method further includes generating a second model of the elongate instrument based at least in part on a reference pose of the elongate instrument. The method further includes comparing the first model with the second model. The method further includes determining that the comparison of the first model with the second model exceeds a threshold difference along a portion of the elongate instrument. The method further includes determining a state of a system configuration based on a location of the portion of the elongate instrument along a length of the elongate instrument.

Consistent with other embodiments, a method performed by a control system is provided. The method includes generating a first model of an elongate instrument. The method further includes generating a second model of the elongate instrument based at least in part on a reference pose of the elongate instrument. The method further includes determining a difference between the first model and the second model and that the difference exceeds a threshold. The method further includes characterizing a direction of the difference between the first model and the second model where the difference exceeds the threshold. The method further includes determining a state of a system configuration based on the characterized direction.

Consistent with other embodiments, a method performed by a control system is provided. The method includes generating a first model of an elongate instrument. The method further includes generating a second model of the elongate instrument based at least in part on a reference pose of the elongate instrument. The method further includes comparing the first model with the second model. The method further includes determining a first location along a length of the elongate instrument where the comparison of the first model with the second model exceeds a first threshold difference between the first model and the second model. The method further includes determining a second location along the length of the elongate instrument where the comparison of the first model with the second model exceeds a second threshold difference between the first model and the second model. The method further includes determining, based on the determination that the comparison of the first model with the second model exceeds the first and second threshold differences, a state of a system configuration.

Consistent with other embodiments, a method performed by a control system is provided. The method includes generating a first model of an elongate instrument. The method further includes generating a second model of the elongate instrument based at least in part on a reference pose of the elongate instrument. The method further includes comparing the first model with the second model. The method further includes determining a status of the elongate instrument. The method further includes determining that the comparison of the first model with the second model exceeds a threshold difference. The method further includes determining a state of a system configuration based on the status of the elongate instrument and based on the determination that the comparison of the first model with the second model exceeds the threshold difference.

Other embodiments include corresponding computer systems, apparatus, and computer programs recorded on one or more computer storage devices, each configured to perform the actions of the methods.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTIONS OF THE DRAWINGS

FIG. 2A is a simplified diagram of a medical instrument system according to some embodiments.

FIG. 2B is a simplified diagram of a medical instrument system with an extended medical tool according to some embodiments.

FIGS. 5A and 5B illustrate system configurations of a medical instrument associated with measured models according to some embodiments.

FIG. 6B is a graphical illustration of a length of time in which a measured model of a medical instrument deviates from a predicted model of the medical instrument and crosses a threshold difference as a result of patient motion according to some embodiments.

FIG. 6C is a graphical illustration of a length of time in which a measured model of a medical instrument deviates from a predicted model of the medical instrument and crosses a threshold difference as a result of buckling of the medical instrument according to some embodiments.

Figure 1:
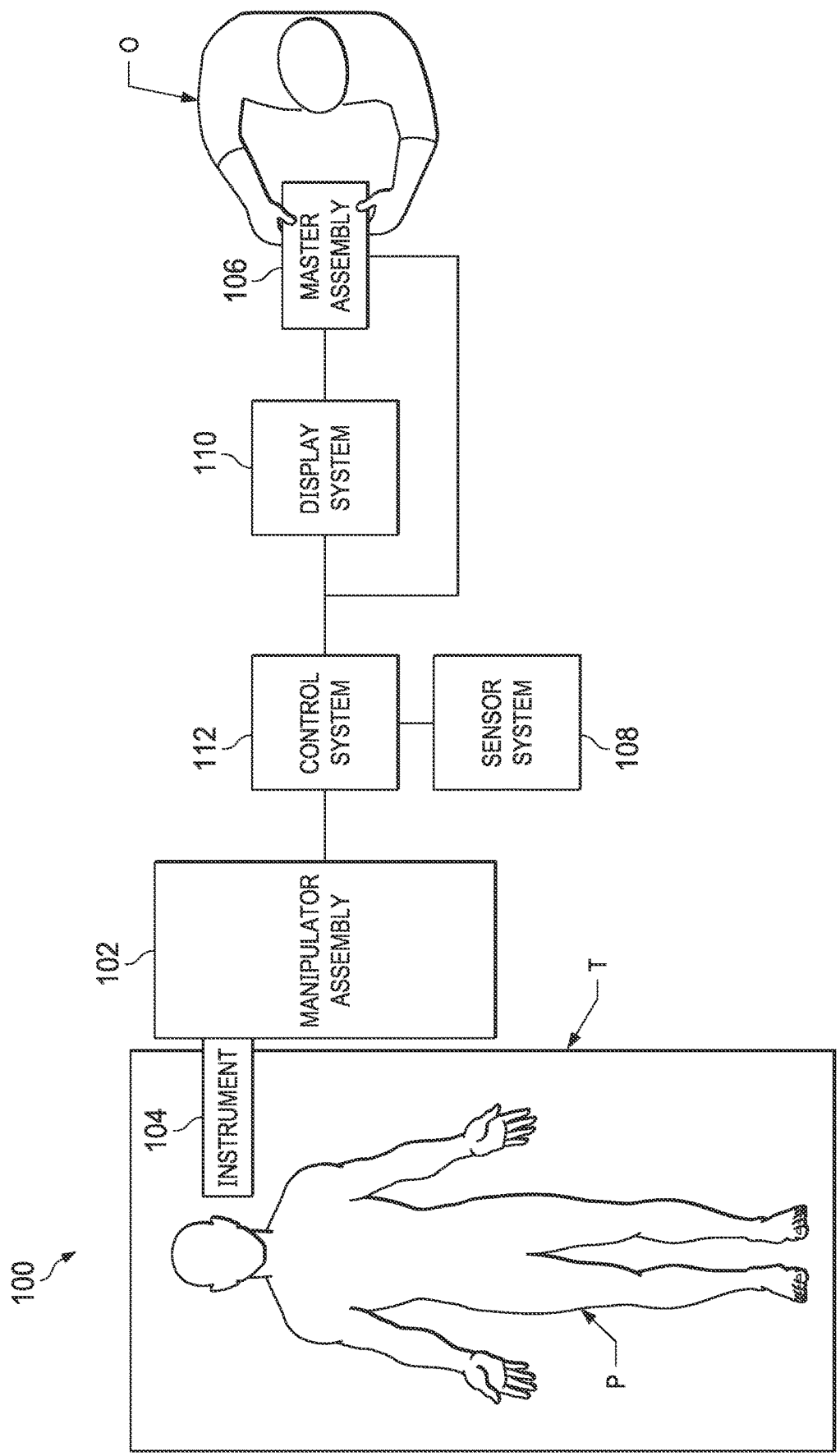
FIG. 1 is a simplified diagram of a teleoperated medical system according to some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some instances, well known methods, procedures, components, and circuits have not been described in detail so as not to unnecessarily obscure aspects of the embodiments.

This disclosure describes various instruments and portions of instruments in terms of their state in three-dimensional space. As used herein, the term "position" refers to the location of an object or a portion of an object in a three-dimensional space (e.g., three degrees of translational freedom along Cartesian x-, y-, and z-coordinates). As used herein, the term "orientation" refers to the rotational placement of an object or a portion of an object (three degrees of rotational freedom e.g., roll, pitch, and yaw). As used herein, the term "pose" refers to the position of an object or a portion of an object in at least one degree of translational freedom and to the orientation of that object or portion of the object in at least one degree of rotational freedom (up to six total degrees of freedom). As used herein, the term "shape" refers to a set of poses, positions, or orientations measured along an object.

The disclosure is generally directed to methods and systems for determining buckling of a medical instrument during a medical procedure. Embodiments of the present disclosure also monitor the motion of a patient undergoing a medical procedure and may determine whether divergent movement of a medical instrument is the result of patient motion or buckling of the medical instrument. Embodiments of the present disclosure utilize information from assemblies and instruments that have a primary purpose other than monitoring patient motion and buckling of a medical instrument. Accordingly, embodiments of the present disclosure may obviate the need of a dedicated patient motion and/or instrument buckling monitoring device by enabling other systems and devices to secondarily provide patient motion and/or instrument buckling monitoring means. The principles of the present disclosure may also be applied to dedicated devices to improve their accuracy and performance in monitoring patient motion and/or instrument buckling. While some embodiments provided herein are discussed primarily with respect to medical procedures, any reference to medical or surgical instruments and medical or surgical methods is non-limiting. The systems, instruments, and methods described herein may be used for animals, human cadavers, animal cadavers, human or animal tissue removed from human or animal anatomy and not to be returned to such human or animal anatomy, non-surgical treatment, diagnosis, or cosmetic improvements. The systems, instruments, and methods described herein may also be used for industrial systems and general robotic or teleoperational systems, including those for manipulating or otherwise interacting with work pieces not comprising human or animal tissue.

As shown in FIG. 1, medical system 100 generally includes a manipulator assembly 102 for operating a medical instrument 104 in performing various procedures on a patient P positioned on a table T. The manipulator assembly 102 may be teleoperated, non-teleoperated, or a hybrid teleoperated and non-teleoperated assembly with select degrees of freedom of motion that may be motorized and/or teleoperated and select degrees of freedom of motion that may be non-motorized and/or non-teleoperated. Master assembly 106 generally includes one or more control devices for controlling manipulator assembly 102. Manipulator assembly 102 supports medical instrument 104 and may optionally include a plurality of actuators or motors that drive inputs on medical instrument 104 in response to commands from a control system 112. The actuators may optionally include drive systems that when coupled to medical instrument 104 may advance medical instrument 104 into a naturally or surgically created anatomic orifice. Actuator position sensors such as resolvers, encoders, potentiometers, and other mechanisms may provide sensor data to medical system 100 describing the rotation and orientation of the motor shafts. This position sensor data may be used to determine motion of the objects manipulated by the actuators.

Medical system 100 also includes a display system 110 for displaying an image or representation of the surgical site and medical instrument 104 generated by sub-systems of sensor system 108. Display system 110 and master assembly 106 may be oriented so operator O can control medical instrument 104 and master assembly 106 with the perception of telepresence.

Medical system 100 may also include control system 112. Control system 112 includes at least one memory and at least one computer processor (not shown) for effecting control between medical instrument 104, master assembly 106, sensor system 108, and display system 110. Control system 112 also includes programmed instructions (e.g., a non-transitory machine-readable medium storing the instructions) to implement some or all of the methods described in accordance with aspects disclosed herein, including instructions for providing information to display system 110. FIG. 2A is a simplified diagram of a medical instrument system 200 according to some embodiments. Medical instrument system 200 includes elongate device 202, such as a flexible catheter, coupled to a drive unit 204. Elongate device 202 includes a flexible body 216 having proximal end 217 and distal end or tip portion 218. Medical instrument system 200 further includes a tracking system 230 for determining the position, orientation, speed, velocity, pose, and/or shape of distal end 218 and/or of one or more segments 224 along flexible body 216 using one or more sensors and/or imaging devices as described in further detail below.

Tracking system 230 may optionally track distal end 218 and/or one or more of the segments 224 using a shape sensor 222. Shape sensor 222 may optionally include an optical fiber aligned with flexible body 216 (e.g., provided within an interior channel (not shown) or mounted externally). The optical fiber of shape sensor 222 forms a fiber optic bend sensor for determining the shape of flexible body 216. In one alternative, optical fibers including Fiber Bragg Gratings (FBGs) are used to provide strain measurements in structures in one or more dimensions. Various systems and methods for monitoring the shape and relative position of an optical fiber in three dimensions are described in U.S. patent application Ser. No. 11/180,389 (filed Jul. 13, 2005) (disclosing "Fiber optic position and shape sensing device and method relating thereto"); U.S. patent application Ser. No. 12/047,056 (filed on Jul. 16, 2004) (disclosing "Fiber-optic shape and relative position sensing"); and U.S. Pat. No. 6,389,187 (filed on Jun. 17, 1998) (disclosing "Optical Fibre Bend Sensor"), which are all incorporated by reference herein in their entireties. Sensors in some embodiments may employ other suitable strain sensing techniques, such as Rayleigh scattering, Raman scattering, Brillouin scattering, and Fluorescence scattering. In some embodiments, the shape of the elongate device may be determined using other techniques. For example, a history of the distal end pose of flexible body 216 can be used to reconstruct the shape of flexible body 216 over the interval of time. In some embodiments, tracking system 230 may optionally and/or additionally track distal end 218 using a position sensor system 220. Position sensor system 220 may be a component of an EM sensor system with position sensor system 220 including one or more conductive coils that may be subjected to an externally generated electromagnetic field. Each coil of the EM sensor system then produces an induced electrical signal having characteristics that depend on the position and orientation of the coil relative to the externally generated electromagnetic field. In some embodiments, position sensor system 220 may be configured and positioned to measure six degrees of freedom, e.g., three position coordinates X, Y, Z and three orientation angles indicating pitch, yaw, and roll of a base point or five degrees of freedom, e.g., three position coordinates X, Y, Z and two orientation angles indicating pitch and yaw of a base point. Further description of a position sensor system is provided in U.S. Pat. No. 6,380,732 (filed Aug. 11, 1999) (disclosing "Six-Degree of Freedom Tracking System Having a Passive Transponder on the Object Being Tracked"), which is incorporated by reference herein in its entirety.

Flexible body 216 includes a channel 221 sized and shaped to receive a medical instrument 226. In various embodiments, any of the antenna instruments and sheaths described above may be inserted through the channel 221 of the flexible body 216. FIG. 2B is a simplified diagram of flexible body 216 with medical instrument 226 extended according to some embodiments. In some embodiments, medical instrument 226 may be used for procedures such as surgery, biopsy, ablation, illumination, irrigation, or suction. Medical instrument 226 can be deployed through channel 221 of flexible body 216 and used at a target location within the anatomy. Medical instrument 226 may include, for example, image capture probes, biopsy instruments, laser ablation fibers, and/or other surgical, diagnostic, or therapeutic tools. Medical instrument 226 may be used with an imaging instrument (e.g., an image capture probe) also within flexible body 216.

Flexible body 216 may also house cables, linkages, or other steering controls (not shown) that extend between drive unit 204 and distal end 218 to controllably bend distal end 218 as shown, for example, by broken dashed line depictions 219 of distal end 218. In some examples, at least four cables are used to provide independent "up-down" steering to control a pitch of distal end 218 and "left-right" steering to control a yaw of distal end 218. Steerable elongate devices are described in detail in U.S. patent application Ser. No. 13/274,208 (filed Oct. 14, 2011) (disclosing "Catheter with Removable Vision Probe"), which is incorporated by reference herein in its entirety.

The information from tracking system 230 may be sent to a navigation system 232 where it is combined with information from image processing system 231 and/or the preoperatively obtained models to provide the operator with real-time position information. In some examples, the real-time position information may be displayed on display system 110 of FIG. 1 for use in the control of medical instrument system 200. In some examples, control system 112 of FIG. 1 may utilize the position information as feedback for positioning medical instrument system 200. Various systems for using fiber optic sensors to register and display a surgical instrument with surgical images are provided in U.S. patent application Ser. No. 13/107,562, filed May 13, 2011, disclosing, "Medical System Providing Dynamic Registration of a Model of an Anatomic Structure for Image-Guided Surgery," which is incorporated by reference herein in its entirety.

In some examples, medical instrument system 200 may be teleoperated within medical system 100 of FIG. 1. In some embodiments, manipulator assembly 102 of FIG. 1 may be replaced by direct operator control. In some examples, the direct operator control may include various handles and operator interfaces for hand-held operation of the instrument.

Figure 3A:
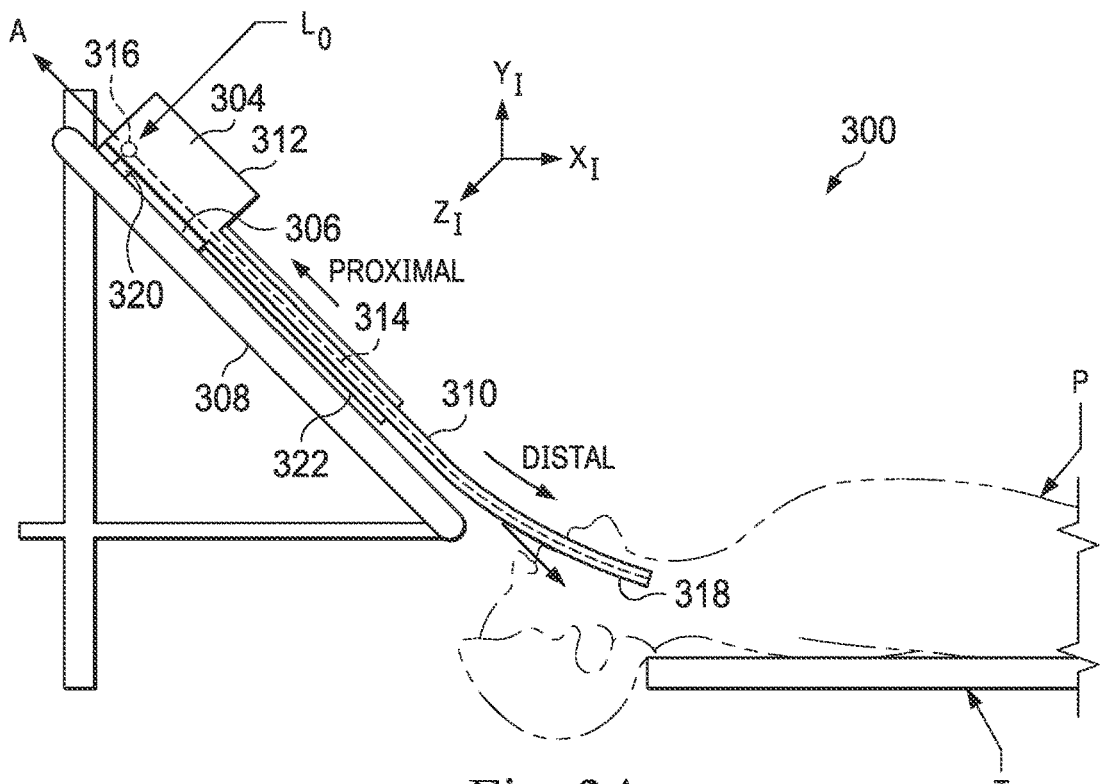
FIGS. 3A and 3B are simplified diagrams of side views of a patient in a patient coordinate space including a medical instrument mounted on an insertion assembly according to some embodiments.
Figure 3B:
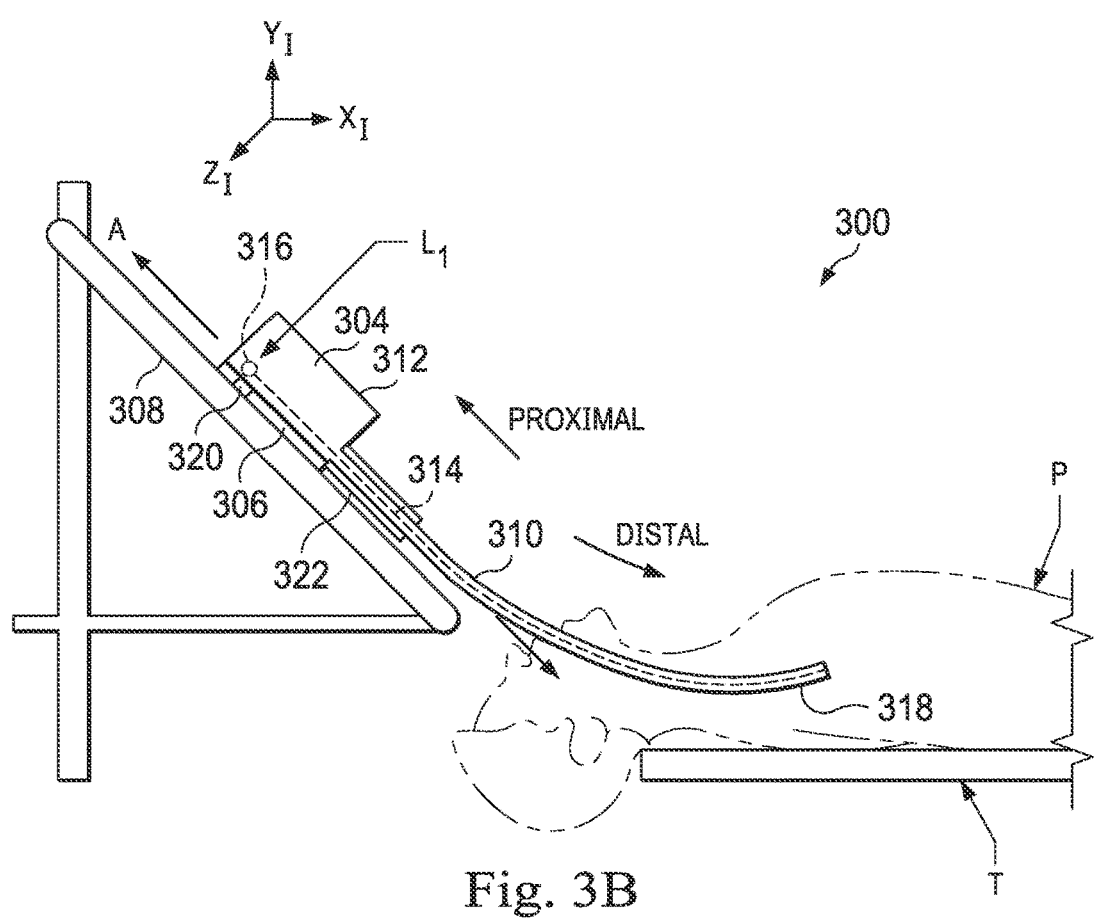

FIGS. 3A and 3B are simplified diagrams of side views of a patient coordinate space including a medical instrument mounted on an insertion assembly according to some embodiments. As shown in FIGS. 3A and 3B, a surgical environment 300 includes the patient P is positioned on the operating table T. Within surgical environment 300, a medical instrument 304 is coupled to an instrument carriage 306. The medical instrument 304 may be provided by the medical instrument system 200 of FIGS. 2A and 2B. In some embodiments, medical instrument 304 may use EM sensors, shape-sensors, and/or other sensor modalities. Instrument carriage 306 is mounted to an insertion stage 308 fixed within surgical environment 300. Alternatively, insertion stage 308 may be movable but have a known location (e.g., via a tracking sensor or other tracking device) within surgical environment 300. Instrument carriage 306 may be a component of a teleoperational manipulator assembly (e.g., teleoperational manipulator assembly 102) that couples to medical instrument 304 to control insertion motion (i.e., motion along the A axis) and, optionally, motion of a distal end 318 of an elongate device 310 in multiple directions including yaw, pitch, and roll. The elongate device 310 may be a flexible, steerable catheter. Instrument carriage 306 or insertion stage 308 may include actuators, such as servomotors, (not shown) that control motion of instrument carriage 306 along insertion stage 308.

Elongate device 310 is coupled to an instrument body 312. Instrument body 312 is coupled and fixed relative to instrument carriage 306. In some embodiments, an optical fiber shape sensor 314 is fixed at a proximal point 316 on instrument body 312. In some embodiments, proximal point 316 of optical fiber shape sensor 314 may be movable along with instrument body 312 but the location of proximal point 316 may be known (e.g., via a tracking sensor or other tracking device). Shape sensor 314 measures a shape from proximal point 316 to another point such as distal end 318 of elongate device 310. Medical instrument 304 may be substantially similar to medical instrument system 200.

A position measuring device 320 provides information about the position of instrument body 312 as it moves on insertion stage 308 along an insertion axis A. Position measuring device 320 may include resolvers, encoders, potentiometers, and/or other sensors that determine the rotation and/or orientation of the actuators controlling the motion of instrument carriage 306 and consequently the motion of instrument body 312. In some embodiments, insertion stage 308 is linear. In some embodiments, insertion stage 308 may be curved or have a combination of curved and linear sections.

FIG. 3A shows instrument body 312 and instrument carriage 306 in a retracted position along insertion stage 308. In this retracted position, proximal point 316 is at a position $L_0$ on axis A. In FIG. 3B, instrument body 312 and instrument carriage 306 have advanced along the linear track of insertion stage 308 and distal end 318 of elongate device 310 has advanced into patient P. In this advanced position, the proximal point 316 is at a position $L_1$ on the axis A. In some examples, encoder and/or other position data from one or more actuators controlling movement of instrument carriage 306 along insertion stage 308 and/or one or more position sensors associated with instrument carriage 306 and/or insertion stage 308 is used to determine the position $L_x$ of proximal point 316 relative to position $L_0$. In some examples, position $L_x$ may further be used as an indicator of the distance or insertion depth to which distal end 318 of elongate device 310 is inserted into the passageways of the anatomy of patient P.

FIGS. 3A and 3B also depict an anti-buckling guide 322, which is an extendible mechanism, such as a lattice or other deployable structure, that supports the proximal end of the elongate device 310 during insertion and retraction. Additional details of exemplary extendible mechanisms are included in the disclosure of PCT/US17/41160 filed Jul. 7, 2017 titled "Guide Apparatus for Delivery of an Elongate Device and Methods of Use," which is incorporated herein in its entirety.

Figure 4A:
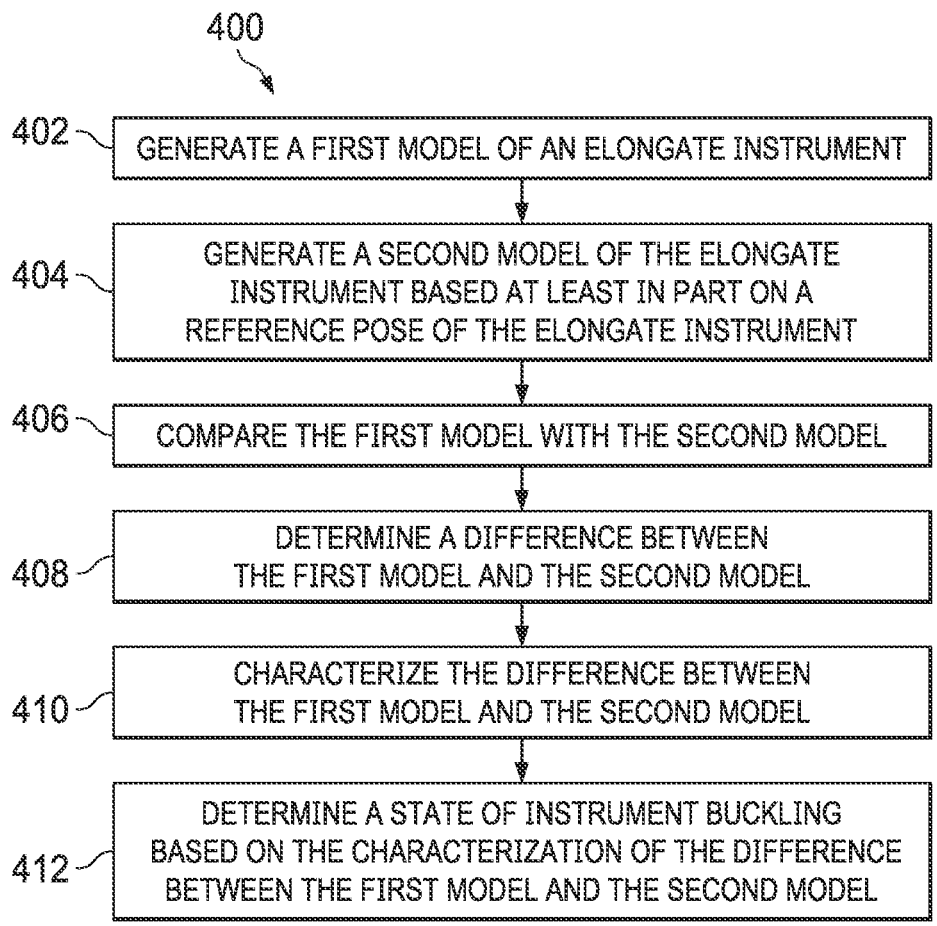
FIGS. 4A and 4B are flowcharts of a method for characterizing a difference between a measured model and a predicted model of a medical instrument during a medical procedure according to some embodiments.

FIG. 4A illustrates a method 400 for determining if an elongate instrument (e.g., medical instrument 104, which may also be referred to as an elongate device) is in a buckled state. The method can include determining the state of a system configuration of the elongate instrument, which may include determining the state of the patient, including identifying whether the patient has moved or identifying the type of movement of the patient, such as a cough or an expected periodic motion such as respiratory motion and differentiating the state of the patient from a buckled state of the instrument.

At a process 402, a first model of an elongate instrument (e.g., medical instrument 104) is generated. The first model may also be referred to as a measured model or a current measured model of the medical instrument 104. The first model may correspond to the medical instrument 104 at a current time at a first insertion position of the anatomy. In one embodiment, the first model may be understood as characterizing the current measured state of the medical instrument 104.

In some instances, the first model of the medical instrument 104 may be understood as a set of data that represents the state (e.g., pose, shape, or motion) of the medical instrument 104, which may include data describing the state of the elongate device 202 of FIGS. 2A and 2B and/or the carriage 306 and insertion stage 308 of FIGS. 3A and 3B. The set of data may include measured data associated with points along the length of a catheter. As an example, the first model of the medical instrument 104 may be generated by the control system 112 using data from a rotational or translational sensor indicative of a rotational or translational position (e.g., using encoder or other position sensor data), velocity, or acceleration of a capstan, rotational drive element, or linear drive element in the drive unit 204 or in manipulator assembly 102 of FIG. 2A. As another example, the control system 112 may use tension sensors that monitor the tension on cables extending through a medical instrument (e.g., elongate device 202) to control a distal end thereof. Alternatively or additionally, the control system may use a fiber optic shape sensor, like the shape sensor 314 of FIGS. 3A and 3B, or a set of electromagnetic coils disposed at positions along the length of the medical instrument to generate at least some of the data used in producing the first model. In some instances, the first model of the medical instrument may model all of the moving components of a medical instrument system, such that the medical instrument can be fully modeled in a known reference frame. In some instances, the first model may describe only a portion of the medical instrument. For example, only a distal portion or a more proximal portion of the flexible body 216 of the elongate device 202 (FIGS. 2A and 2B) is included in the first model in some embodiments.

At a process 404, a second model of the elongate instrument based at least in part on a reference pose of the elongate instrument is generated. The second model may be produced by the control system 112 and may be based on a different data source than the first model, a subset of the sources incorporated in the first model, or a combination of the different data source and the subset of the sources incorporated in the first model. The second model may be understood as characterizing a predicted/expected state (e.g., pose, shape, or motion) of the medical instrument 104, and is also referred to as a predicted model and/or an expected model.

The predicted model indicates the expected state (e.g., pose, shape, or motion) of the measured model given certain assumptions. The assumptions may include many factors, such as the measured state of the medical instrument 104 at one or more times. The measured state of the medical instrument 104 at the different times may be measured at the different times and recorded by a processing device (e.g., a processing device in the control system 112). The underlying assumptions may further include data from one or more rotational or translational sensors in the drive unit 204 of FIG. 2. The underlying assumptions may include a combination of assumptions. For example, the second model may combine the measured state(s) (e.g., using one or more corresponding reference models) of the medical instrument 104 with the data from one or more rotational or translational sensors (such as insertion) in the drive unit 204 of FIG. 2 at a specified time (e.g., a first time, a second time, etc.).

The assumptions may further include knowledge of the mechanical behavior of the medical instrument 104, for example the expected motion of the distal end 218 of the flexible body 216 of the elongate device 202 based on measured motion of the proximal end. This expected motion may be based on the physical dimensions and properties of the components that make up the elongate device 202, in addition to the measured motion of the proximal end 217. The underlying assumptions may further include knowledge of the tissues of the patient P that provide the environment surrounding the medical instrument 104 when in use. For example, CT scans may be segmented and processed to categorize the tissue types around the work site and to define their dimensions. The control system 112 may include a table of physical properties associated with each of the tissue types and may use a three-dimensional model of patient anatomy and the physical properties of the tissue types in order to predict how the tissue will affect the medical instrument 104. For example, the patient anatomy may push on the medical instrument 104 in one direction or another such that the control system 112 predicts a location of the pushed portion of the medical instrument 104 based on the anatomy and its properties, e.g., its propensity to push the medical instrument 104 in a particular direction with a particular force.

Figure 4B:
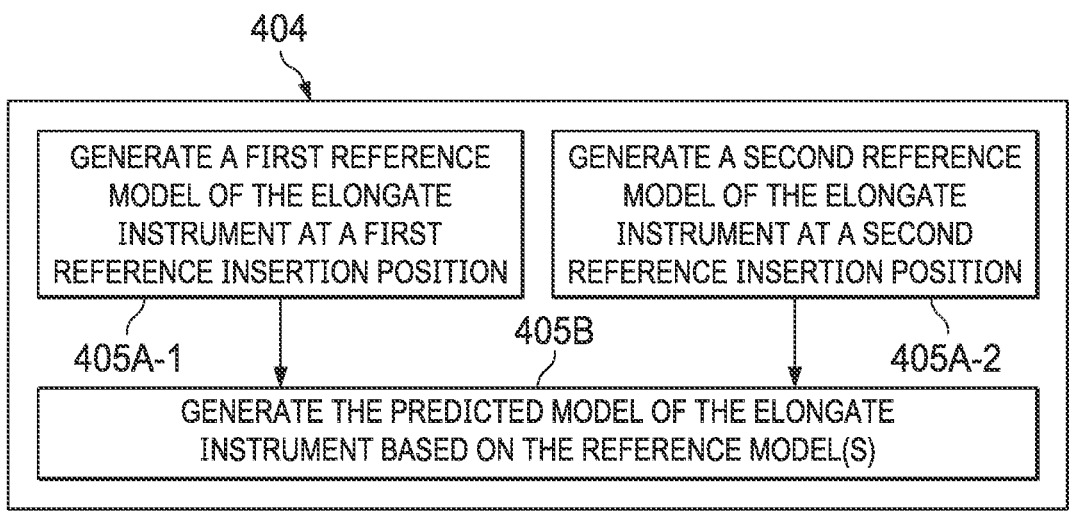

FIG. 4B is a flowchart of the process 404 for generating the second model of the elongate instrument according to some embodiments. As illustrated in FIG. 4B, in some embodiments, process 404 includes process 405A-1, where a processing device generates a first reference model of the elongate instrument based on a measured state of the elongate instrument at a first reference insertion position. The first reference insertion position of process 405A-1 may be the same as or different from the first insertion position of process 402. The process 404 further includes process 405A-2, where the processing device generates a second reference model of the elongate instrument based on a measured state of the elongate instrument at a second reference insertion position. The second reference insertion position of process 405A-2 may be the same as or different from the first reference insertion position of process 405A-1 and/or the first insertion position of process 402. The measured states of the medical instrument 104 of processes 405A-1 and 405A-2 may be measured at a time (also referred to as a first time) when the medical instrument 104 is at the first insertion position. The measured states of the medical instrument 104 of processes 405A-1 and 405A-2 may also be measured at a time (also referred to as a second time) when the medical instrument 104 is at a second insertion position. In some embodiments, the first time is before the second time, and the first insertion location is proximal of the second insertion location. In other embodiments, the first time is before the second time, and the first insertion location is distal of the second insertion location. The time separation between the first time and the second time may be short, e.g. milliseconds or seconds, but may also be longer. It is noted that while two reference models from processes 405A-1 and 405A-2 are described, process 404 may include processes to generate any number (e.g., one, two, . . . , N) of reference models associated with reference insertion positions that are the same as or different from each other.

In some embodiments, process 404 includes process 405B, where the processing device generates the predicted model of the elongate instrument (e.g., at the first insertion position of process 402) based on the one or more reference models of processes 405A-1 and 405A-2. For example, the predicted model may be generated using the first insertion position of the first model of process 402 and/or the reference insertion positions of the reference models of processes 405A-1 and 405A-2. In some embodiments, the predicted model may include a probability distribution of the possible expected state of the medical instrument 104, including for example, a mean and a standard deviation.

Referring to FIGS. 5A and 5B, FIG. 5A illustrates a representation of a lung 450a including a predicted model 500 of a medical instrument 104 and a measured model 512 of the medical instrument 104, according to some embodiments. In the embodiment shown in FIG. 5A, the state of the system indicates a buckled state of the medical instrument 104. FIG. 5B illustrates a representation of a lung 450b including a predicted model 500 of the medical instrument 104 and a measured model 510 of the medical instrument 104, according to some embodiments. In the embodiment shown in FIG. 5B, the state of the system indicates a moved state of the patient P. In both representations 450a, 450b, the models are shown in the context of a lung L.

With reference again to FIG. 4A, at a process 406, the control system 112 compares the first model (e.g., the measured model) with the second model (e.g., the predicted model). At a process 408, the control system 112 determines a difference or deviation between the first model and the second model.

At a process 410, the difference between the first and second models is characterized by the control system 112. For example, the first model may differ from the second model over time, and the difference can be characterized as a drifting deviation. In other examples, the first model may differ from the second model quickly, and the difference can be characterized as an abrupt deviation. In another example, the difference between the first and second models occurs concurrently with an event, such as an input command from a user. The difference can be characterized as uniform or non-uniform along a length of the instrument. In other examples, the difference occurs at a specific location along a length of the instrument, in a specific direction (e.g., in a direction normal to the predicted model or in a direction along the longitudinal axis of the predicted model), and/or at multiple locations along the length of the instrument in different directions.

The characterization of the difference between the first model and the second model can be used to determine a state of buckling of the instrument, as illustrated in process 412. The characterization of the difference can be used to indicate behavior that is more likely to occur during buckling of the medical instrument 104 rather than during patient movement. For example, by comparing the measured and predicted models 512, 500 and determining that the models 512, 500 differ by a threshold, a state of a system configuration can be determined. Various methods can be implemented without characterizing the difference between the measured model 512 and the predicted model 500 to help determine if the state of the system configuration includes patient motion due to the patient P having moved or identifying the type of movement of the patient P, such as a cough or an expected periodic motion (e.g., respiratory motion). Details on such methods are described in PCT application number PCT/US2018/046685, filed Aug. 14, 2018, disclosing "Systems and Methods for Monitoring Patient Motion During a Medical Procedure," which is incorporated by reference herein in its entirety. When observing a difference in the measured model 512 and the predicted model 500 without characterization, it can be difficult, in some embodiments, to distinguish whether deviations are a result of patient motion or instrument buckling. By identifying that not only a difference is found between the measured model 512 and the predicted model 500 but characterizing the difference, specifically where/when/how the difference is outside a threshold, a more accurate determination of the state of the system can be established, including detecting a state of instrument buckling.

Buckling may occur for several different reasons, such as insertion of the medical instrument 104 while being constrained within or by anatomy, e.g., insertion into a small branch, insertion while a distal tip face of the medical instrument 104 is making contact with an airway wall, insertion around a tight bend within anatomy, etc. Thus, a deviation between models during an insertion command could be an indicator of buckling while a deviation between models without an insertion command, i.e., the medical instrument 104 would not be driving forward in the insertion direction, would be an indicator of patient movement.

In some embodiments, when instrument buckling occurs, the measured model may deviate from the predicted model 500 in a generally non-uniform deviation along the entire length of the medical instrument 104. However, a uniform deviation along the length of the medical instrument 104 could indicate movement of the entire patient anatomy, e.g., the entire lung shifts, due voluntary or involuntary patient movement. In most cases, buckling occurs proximal to the section of the medical instrument 104 caught in patient anatomy, since the medical instrument 104 is actuated, and thereby inserted, from a proximal end of the medical instrument 104. Accordingly, a deviation identified at a proximal section of the medical instrument 104 can be more indicative of buckling than at a distal section of the medical instrument 104, which could indicate buckling and/or patient movement. As the medical instrument 104 buckles, in some embodiments, a buckled section of the medical instrument 104 is more likely to deviate in an axial direction resulting in a deviation between the measured and predicted models 512, 500 in an axial direction. Patient movement would more likely manifest in a deviation in a radial direction along the length of the medical instrument 104.

In some embodiments, the method 400 may include an optional process of weighting the various characterized types of deviation, such as a drifting deviation, an abrupt deviation, deviation occurring concurrently with a user input command, uniform or non-uniform deviation, deviation at one or more specific locations of the medical instrument 104, deviation in one or more specific directions, etc. The control system 112 may assign a different weight to each characterized type of deviation. However, some characterized types may be weighted equally. Some weights may indicate that instrument buckling likely occurred, and these characterized types of deviation may be referred to as high factor probability indicators of buckling. Exemplary high factor probability indicators of buckling include a drifting deviation, deviation occurring concurrently with a user input command, non-uniform deviation, deviation at a proximal portion of the medical instrument 104, and deviation in an axial direction. Other weights may indicate that patient motion likely occurred, and these characterized types of deviation may be referred to as high factor probability indicators of patient motion. Exemplary high factor probability indicators of patient motion include an abrupt deviation, uniform deviation, deviation at a distal portion of the medical instrument 104, and deviation in a radial direction. After weighting the various characterized types of deviation, the control system 112 may combine some or all of the weighted characterized types of deviation to determine a state of the system.

Figure 6A:
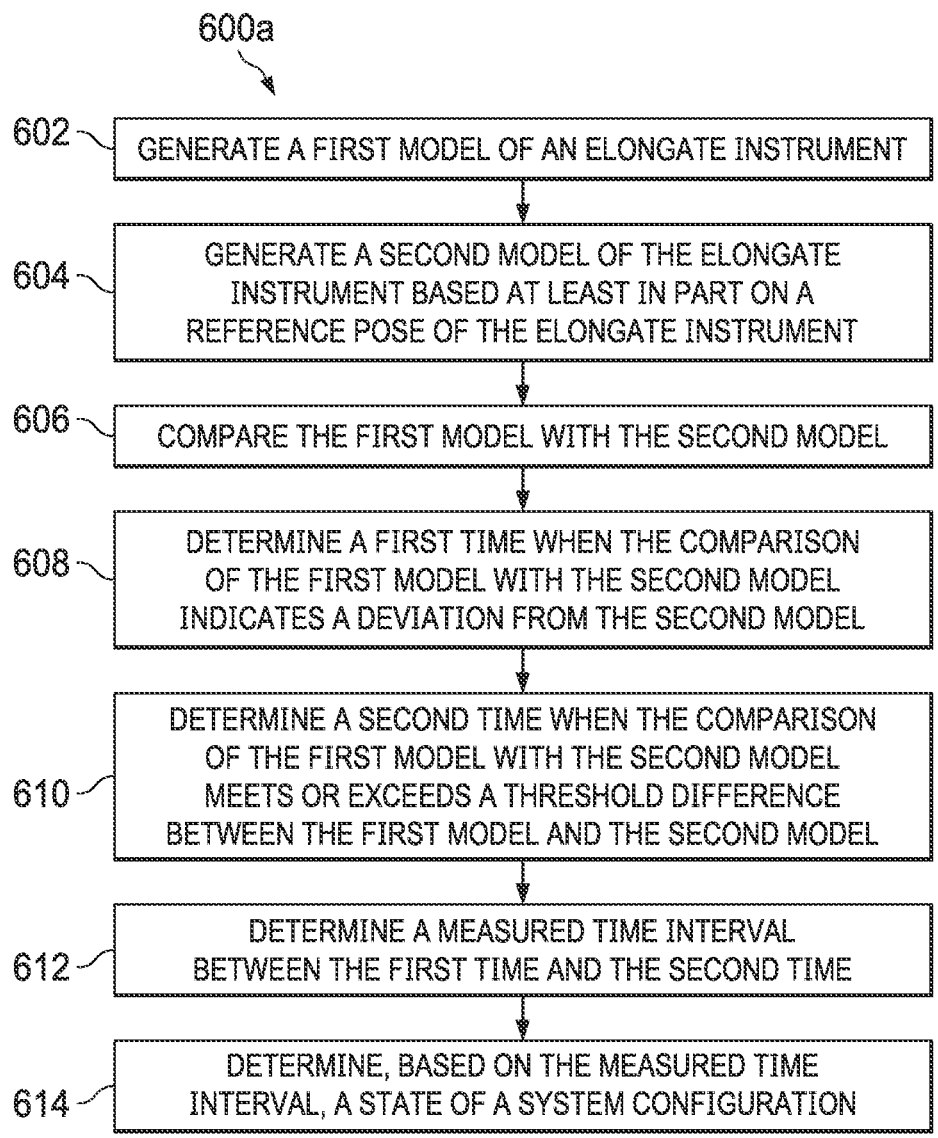
FIG. 6A is a flowchart of a method for determining a state of a system configuration of a medical instrument by monitoring drift during a medical procedure according to some embodiments.

FIG. 6A illustrates a method 600a, according to some embodiments, for determining a state of a system configuration of an elongate instrument (e.g., medical instrument 104, which may also be referred to as an elongate device) by monitoring drift during a medical procedure, i.e., when the deviation between measured and expected models is characterized as drift. To determine the state of the system configuration that caused the deviation between the predicted and measured models, the rate of instrument drift over successive measured models may be analyzed by the control system 112. When the deviation between the predicted and measured models is abrupt, the state of the system configuration is likely patient motion, e.g., resulting from the patient sitting up, coughing, or a patient table being suddenly bumped. When the deviation between the predicted and measured models is gradual, the state of the system configuration is likely buckling, e.g., the measured instrument pose is gradually deviating from the predicted model as the instrument is continually inserted.

At a process 602, a first model (e.g., the measured model 512) of an elongate instrument (e.g., medical instrument 104) is generated. At a process 604, a second model (e.g., the predicted model 500) of the elongate instrument based at least in part on a reference pose of the elongate instrument is generated. At a process 606, the control system 112 compares the first model with the second model. The processes 602, 604, and 606 are substantially similar to the process 402, 404, and 406 respectively, discussed above with respect to FIG. 4A, and the discussion of the process 402, 404, and 406 analogously applies to the process 602, 604, and 606.

At a process 608, the control system 112 determines a first time when the comparison of the first model with the second model indicates a deviation from the second model. FIGS. 6A and 6B include graphs 600b and 600c, respectively, that illustrate the change in the measured differences between the predicted model (e.g., model 500) and a succession of measured models (e.g., model 510 or model 512) for a medical instrument over time. The vertical axis represents the measured difference between the predicted model and a measured model for the medical instrument. The horizontal axis represents the time over which the measured models are captured. As shown in FIGS. 6A and 6B, a deviation between the predicted model and the measured model begins at time $T_D$ (e.g., the time when the measured difference increases from approximately zero). In some examples, the measured models 510, 512 may deviate from the predicted model 500 when a longitudinal axis of the measured models 510, 512 does not match with the longitudinal axis of the predicted model 500.

At a process 610, the control system 112 determines a second time $T_{DT}$ when the comparison of the first model with the second model meets or exceeds a threshold difference $D_T$ between the first model and the second model. The threshold difference $D_T$ may be the amount of measured difference that indicates that a significant change in the state of the system configuration has occurred due to, for example, patient movement or instrument buckling. In some examples, the threshold difference $D_T$ is set at a certain radial distance away from the longitudinal axis of the predicted model 500. For example, the threshold may be offset from the longitudinal axis of the predicted model 500 by one millimeter, two millimeters, three millimeters, or any other desired distance.

At a process 612, the control system 112 determines a measured time interval between the first time and the second time. Therefore, the control system 112 may determine the amount of time it takes for the deviation between the measured models 510, 512 and the predicted model 500 to change from the initial point of deviation $T_D$ to the point of meeting or exceeding the threshold difference $D_T$. In FIG. 6A, a time interval $\Delta T1$ between the times $T_D$ and $T_{DT}$ is shorter than a time interval $\Delta T2$ between the times $T_D$ and $T_{DT}$ in FIG. 6B. In other words, the movement of the medical instrument 104 to the threshold difference $D_T$ occurs relatively rapidly in FIG. 6A, but in FIG. 6B the drift of the medical instrument 104 to the threshold difference $D_T$ occurs more slowly. In some embodiments, the time between times $T_D$ and $T_{DT}$ may be approximately zero, indicating an abrupt movement of the measured model from zero deviation with the predicted model to the threshold difference $D_T$.

At a process 614, the control system 112 determines a state of the system configuration based on the measured time interval. The state of the system configuration may be based on a comparison of the measured time interval (e.g., $\Delta T1$, $\Delta T2$) to a status threshold interval $\Delta TS$. The status threshold interval $\Delta TS$ may be set to any desired amount of time (e.g., five milliseconds, ten milliseconds, one second, two seconds, ten seconds, or any other desired amount of time). In the embodiments of FIGS. 6A and 6B, the status threshold interval $\Delta TS$ is associated with an indication of patient movement. In FIG. 6A, when the measured time interval $\Delta T1$ is shorter than the status threshold interval $\Delta TS$, the control system 112 determines that the state of the system configuration indicates that the patient P moved. FIG. 6A may be a graph of the change in the measured difference over time between the predicted model 500 and successive measured models 510. In this embodiment, the abrupt deviation between the measured model 510 and the predicted model 500 may be attributed to patient motion. In FIG. 6B, when the measured time interval $\Delta T2$ is longer than the status threshold interval $\Delta TS$, the control system 112 determines that the state of the system configuration indicates another reason for the deviation, such as instrument buckling. FIG. 6B may be a graph of the change in the measured difference over time between the predicted model 500 and successive measured models 512. In this embodiment, the drift in deviation between the measured model 512 and the predicted model 500 may be attributed to something more gradual than patient motion, such as instrument buckling.

As a result of the process 610 and/or the process 614, the control system 112 may optionally take an action such as issuing an alert to an operator via the display system 110 and/or by altering control of the medical instrument 104. In some embodiments, the control system 112 may display a patient motion message on a display screen. In some embodiments, the user may ignore or dismiss an alert or message, or the user may be unable to dismiss a message until an action is taken. The control system 112 may ignore, disregard, or not implement any movement commands or end effector actuation commands received from the operator until the message is acknowledged. For example, the control system 112 may prevent longitudinal movement of the elongate instrument. In other examples, the control system 112 may prevent bending movement of the elongate instrument. In some embodiments, the control system 112 may actively attempt to maintain the actual location of the medical instrument 104 or may allow the medical instrument 104 to relax and compliantly yield to pressures and forces applied by tissues and surrounding environment. In another embodiment, the control system 112 may disable energy supply to an energized instrument, such as an ablation probe, that may be used in the method 400 to treat the patient P. Additionally, the control system 112 may instruct the user to perform a registration process or update an existing registration between the medical instrument 104, a model of the patient anatomy, and the actual patient anatomy when the control system 112 determines that the patient P has moved. This is because movement of the patient P may cause an existing registration of these features to become unreliable and unsuitable for use by the operator. In other embodiments, when the control system 112 determines that the instrument has buckled, the control system 112 may instruct the user to retract the elongate instrument a specified distance to unbuckle the instrument. In alternative embodiments, the control system 112 may retract the instrument without any user action.

In some embodiments, if the deviation between the first model and the second model is within the threshold, the control system 112 may adjust the predicted model 500 to reduce the amount of any false positive instrument buckling determinations. Reducing false positive determinations may eliminate unnecessary delays in the medical procedure. Therefore, in several embodiments, the control system 112 may adjust the predicted model 500 to account for any detected deviation between the measured models 510, 512 and the predicted model 500. For example, if any deviation between the models occurs, the control system can re-generate the predicted model 500 to follow the measured models 510, 512. This re-generation may reduce the chances of the measured models 510, 512 exceeding the threshold difference between the measured models 510, 512 and the predicted model 500. However, the predicted model 500 may only be adjusted a certain pre-determined amount before the control system 112 determines that the medical instrument 104 has buckled. As an example, the adjustments of the predicted model 500 may include a separate threshold, which, when exceeded, may indicate to the control system 112 that the medical instrument 104 is buckling. Accordingly, while adjusting the predicted model 500 may decrease the chances of false positive buckling determinations, the limits on the predicted model 520 adjustments discussed above may be implemented the ensure that the control system 112 still makes proper instrument buckling determinations when applicable.

Figure 7:
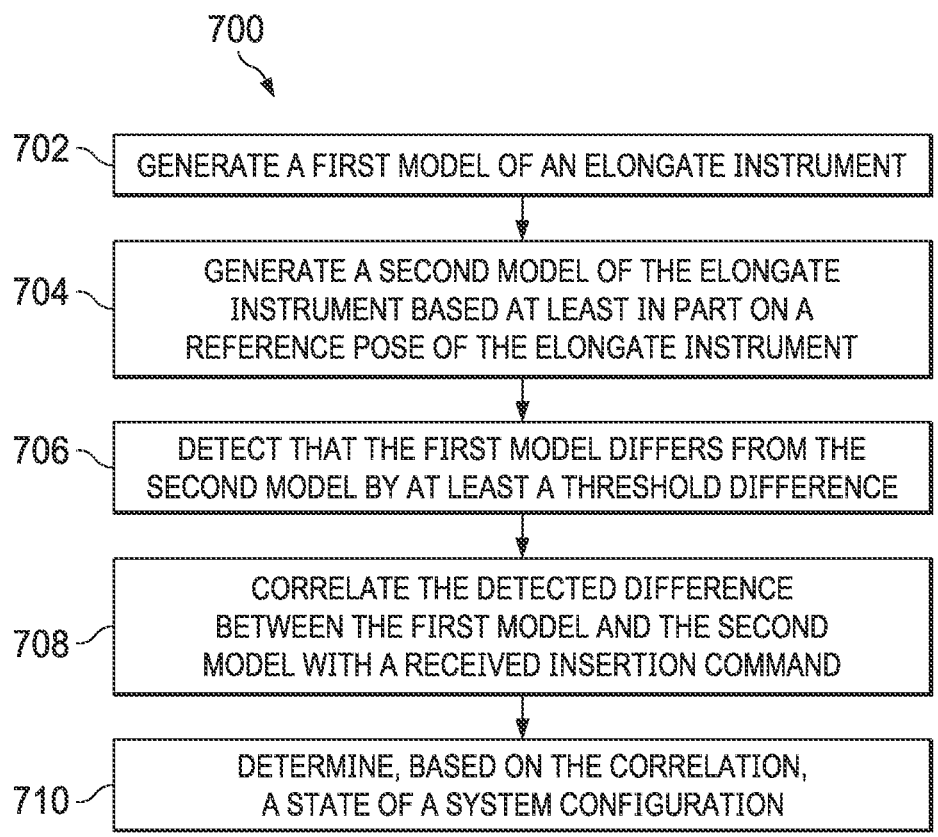
FIG. 7 is a flowchart of a method for determining buckling of a medical instrument by monitoring an insertion command during a medical procedure according to some embodiments.

FIG. 7 is a flowchart of a method 700 for determining buckling of an elongate instrument (e.g., the medical instrument 104) by monitoring an insertion command during a medical procedure according to some embodiments. At a process 702, a first model (e.g., the measured model 512) of the elongate instrument is generated. At a process 704, a second model (e.g., the predicted model 500) of the elongate instrument based at least in part on a reference pose of the elongate instrument is generated. The processes 702 and 704 are substantially similar to the processes 402 and 404, respectively, discussed above with respect to FIG. 4A, and the discussion of the process 402 and 404 analogously applies to the process 802 and 804.

At a process 706, the control system 112 detects that the first model differs from the second model by at least a threshold difference. In some examples, the control system 112 detects the difference between the first model and the second model by comparing the first model with the second model. In such examples, the process 706 is substantially similar to the process 406 discussed above with respect to FIG. 4A, and the discussion of the process 406 analogously applies to the process 706.

At a process 708, the control system 112 correlates the detected difference between the first model and the second model with a received insertion command. In some embodiments, the insertion command may be received by the control system 112. In other embodiments, the insertion command may be received by the medical instrument 104. In some embodiments, the insertion command is generated by the control system 112 in response to a user input. For example, the control system 112 may receive input, such as movement commands, from the physician O as provided via the master assembly 106. The user input may be defined in terms of the manipulation of an input device, such as the master assembly 106, and/or as the translation of that manipulation into control signals for actuators such as a capstan that applies tension on a cable in order to move or otherwise actuate the medical instrument 104. In some embodiments, the medical instrument 104 may be moved from a first insertion distance to a second insertion distance as a result of the received insertion command. In some examples, the second insertion distance is distal of the first insertion distance. In several embodiments, the control system 112 correlates the detected difference between the first model and the second model with a measured insertion, which may be an insertion measurement. The insertion may be measured using a sensor other than the shape sensor 222. For example, the insertion may be measured using an insertion axis sensor, insertion motor encoders, etc. In other embodiments, the insertion may be measured using the shape sensor 222 and one or more additional sensors (e.g., an insertion axis sensor, insertion motor encoders, etc.).

In some instances, the control system 112 correlates the detected difference between the measured model 512 and the predicted model 500 by determining that the detected difference occurred as a result of the received insertion command. In some examples, such a correlation exists when the difference is detected after and/or during insertion of the medical instrument 104 (e.g., from a first insertion distance to a second insertion distance) as a result of the received insertion command. As one example, at the first insertion distance, the measured model 512 may be within the threshold difference of the measured and predicted model, and at the second insertion distance, the measured model 512 may exceed the threshold difference of the measured and predicted model.

At a process 710, the control system 112 determines a state of a system configuration based on the correlation. In such examples, the deviation between the measured model 512 and the predicted model 500 may be attributed to instrument buckling. This is because any deviation between the measured model 512 and the predicted model 500 during, immediately following, and/or soon after a received insertion command is more likely due to instrument buckling than patient motion. In some embodiments, determining that the measured model 512 deviates from (e.g., exceeds a threshold of) the predicted model 500 at a time after an insertion command is received is a factor that weighs in favor, in combination with other detected deviations which are characterized as high factor probability indicators of buckling, of a determination that the deviation can be attributed to instrument buckling.

As discussed above with respect to FIG. 4A, as a result of the process 708 and/or 710, the control system 112 may optionally take an action such as issuing an alert to an operator via the display system 110 and/or by altering control of the medical instrument 104.

FIG. 5A illustrates a representation of a lung 450a including a predicted model 500 of a medical instrument 104 and a measured model 512 of the medical instrument 104, according to some embodiments. FIG. 5B illustrates a representation of a lung 450b including a predicted model 500 of the medical instrument 104 and a measured model 510 of the medical instrument 104, according to some embodiments. In both representations, the models are shown in the context of a lung L.

Figure 8:
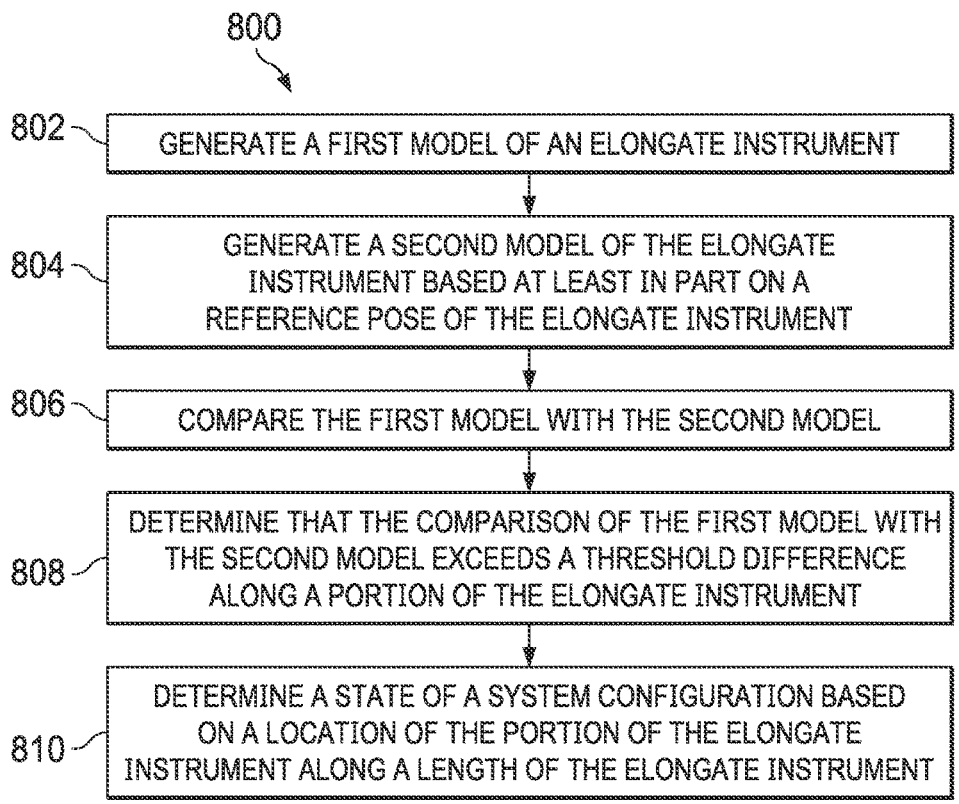
FIG. 8 is a flowchart of a method for determining buckling of a medical instrument by monitoring a location of deviation between a measured model of the medical instrument and a predicted model of the medical instrument during a medical procedure according to some embodiments.

FIG. 8 is a flowchart of a method 800 for determining a state of a system configuration, e.g., buckling of an elongate instrument (e.g., the medical instrument 104) by monitoring a location of deviation between a first model (e.g., the measured model 512 in FIG. 5A) and a second model (e.g., the predicted model 500 in FIG. 5A) of the medical instrument 104 during a medical procedure according to some embodiments. At a process 802, the first model of the elongate instrument is generated. At a process 804, the second model of the elongate instrument based at least in part on a reference pose of the elongate instrument is generated. At a process 806, the control system 112 compares the first model with the second model. The processes 802, 804, and 806 are substantially similar to the processes 402, 404, and 406 respectively, discussed above with respect to FIG. 4A, and the discussion of the processes 402, 404, and 406 analogously applies to the processes 802, 804, and 806.

At a process 808, the control system 112 determines that the comparison of the first model with the second model exceeds a threshold difference along a portion of the elongate instrument. The control system 112 can characterize the location of where the deviation exceeds the threshold difference along the length of the medical instrument 104. For example, in some embodiments, the measured model 512 may deviate from the predicted model 500 at a proximal portion of the medical instrument 104 and/or at a distal portion of the medical instrument 104. The control system 112 can determine that the deviation between the measured model 512 and the predicted model 500 is non-uniform. For example, the control system 112 may determine that the deviation between the models 512, 500 occurs at one portion of the medical instrument 104 but not at another portion. The control system 112 may then determine a specific location along the length of the medical instrument 104 where the deviation occurs. The control system 112 may make this determination after or concurrently with making the determination that the deviation is non-uniform. In some embodiments, the portion of the medical instrument 104 where the comparison of the measured model 512 with the predicted model 500 exceeds the threshold difference between the measured model 512 and the predicted model 500 is at a location that corresponds to a more distal portion 560 of the elongate instrument than distal section 550. In other embodiments, the portion of the medical instrument 104 where the comparison of the measured model 512 with the predicted model 500 exceeds the threshold difference between the measured model 512 and the predicted model 500 is at a location that corresponds to a more proximal portion 540 of the elongate instrument than distal section 550.

At a process 810, the control system 112 determines a state of a system configuration based on the location (determined at process 808) of the portion of the elongate instrument along a length of the elongate instrument. In some embodiments, when the location of the portion of the medical instrument 104 that exceeds the threshold difference between the models 512, 500 is at a proximal portion of the medical instrument 104, the state of the system configuration includes a buckled state of the medical instrument 104. In some embodiments, determining that the location of the portion of the medical instrument 104 that exceeds the threshold difference between the models 512, 500 is at the proximal portion of the medical instrument 104 is a factor that weighs in favor, in combination with other detected deviations which are characterized as high factor probability indicators of buckling, of a determination that the deviation can be attributed to instrument buckling.

In other embodiments, when the location of the portion of the medical instrument 104 that exceeds the threshold difference between the models 512, 500 is at a distal portion of the medical instrument 104, the state of the system configuration includes a moved state of the patient P. In some embodiments, determining that the location of the portion of the medical instrument 104 that exceeds the threshold difference between the models 512, 500 is at the distal portion of the medical instrument 104 is a factor that weighs in favor, in combination with other detected deviations which are characterized as high factor probability indicators of patient motion, of a determination that the deviation can be attributed to patient motion.

As discussed above with respect to FIG. 4A, as a result of the process 808 and/or 810, the control system 112 may take an action such as issuing an alert to an operator via the display system 110 and/or by altering control of the medical instrument 104.

Figure 9:
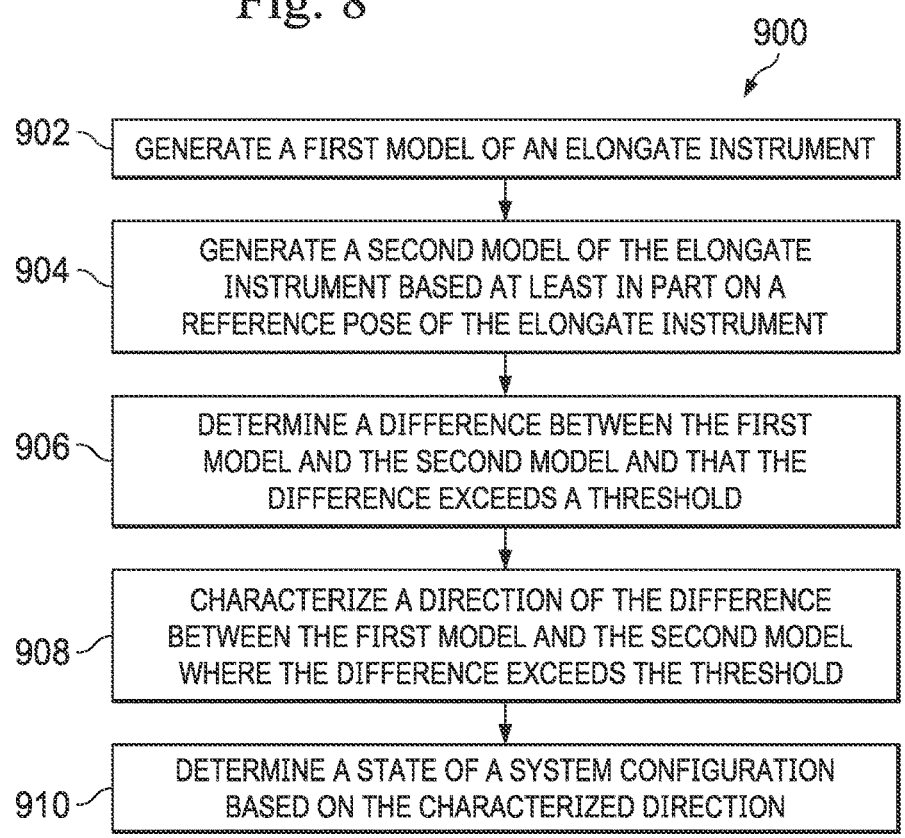
FIG. 9 is a flowchart of a method for determining buckling of a medical instrument by monitoring a direction of deviation between a measured model of the medical instrument and a predicted model of the medical instrument during a medical procedure according to some embodiments.

FIG. 9 is a flowchart of a method 900 for determining buckling of an elongate instrument (e.g., the medical instrument 104) by monitoring a direction of deviation between a first model (e.g., the measured model 512 in FIG. 5A) and a second model (e.g., the predicted model 500 in FIG. 5A) of the medical instrument 104 during a medical procedure according to some embodiments. At a process 902, the first model of the elongate instrument is generated. At a process 904, the second model of the elongate instrument based at least in part on a reference pose of the elongate instrument is generated. The processes 902 and 904 are substantially similar to the processes 402 and 404, respectively, discussed above with respect to FIG. 4A, and the discussion of the processes 402 and 404 analogously applies to the processes 902 and 904.

At a process 906, the control system 112 determines a difference between the first model and the second model and that the difference exceeds a threshold. The process 906 is substantially similar to the process 408 discussed above with respect to FIG. 4A, and the discussion of the process 408 analogously applies to the process 906.

At a process 908, the control system 112 characterizes a direction of the difference between the first model and the second model where the difference exceeds the threshold. In some embodiments, the measured model 512 may deviate from the predicted model 500 in a radial direction and/or in an axial direction. In some examples, the threshold may be measured in a radial direction from the longitudinal axis of the predicted model 500. The radial direction may be generally perpendicular to the longitudinal axis of the predicted model 500. In other examples, the threshold may be measured in an axial direction along the longitudinal axis of the predicted model 500. The axial direction may be generally parallel to the longitudinal axis of the predicted model 500.

At a process 910, the control system 112 determines a state of a system configuration based on the characterized direction. Referring back to FIG. 5A, the measured model 512 deviates from the predicted model 500 beyond a threshold 542 in an axial direction, which can indicate a state of buckling of the medical instrument 104. Referring to FIG. 5B, the measured model 510 deviates from the predicted model 500 beyond a threshold 552 in a radial direction. The deviation in the radial direction can indicate a state of patient movement. Accordingly, in some embodiments, when the direction of the deviation between the measured model 510 and the predicted model 500 is measured in the radial direction (which may be generally perpendicular to the longitudinal axis of the predicted model 500), the state of the system configuration includes a moved state of the patient P. In some embodiments, determining that the direction of the deviation between the measured model 510 and the predicted model 500 is measured in the radial direction is a factor that weighs in favor, in combination with other detected deviations which are characterized as high factor probability indicators of patient motion, of a determination that the deviation can be attributed to patient movement.

In other embodiments, when the direction of the deviation between the measured model 512 and the predicted model 500 is measured in the axial direction (which may be generally parallel to the longitudinal axis of the predicted model 500), the state of the system configuration includes a buckled state of the medical instrument 104. In some embodiments, determining that the direction of the deviation between the measured model 512 and the predicted model 500 is measured in the axial direction is a factor that weighs in favor, in combination with other detected deviations which are characterized as high factor probability indicators of buckling, of a determination that the deviation can be attributed to instrument buckling.

As discussed above with respect to FIG. 4A, as a result of the process 908 and/or 910, the control system 112 may take an action such as issuing an alert to an operator via the display system 110 and/or by altering control of the medical instrument 104.

Figure 10:
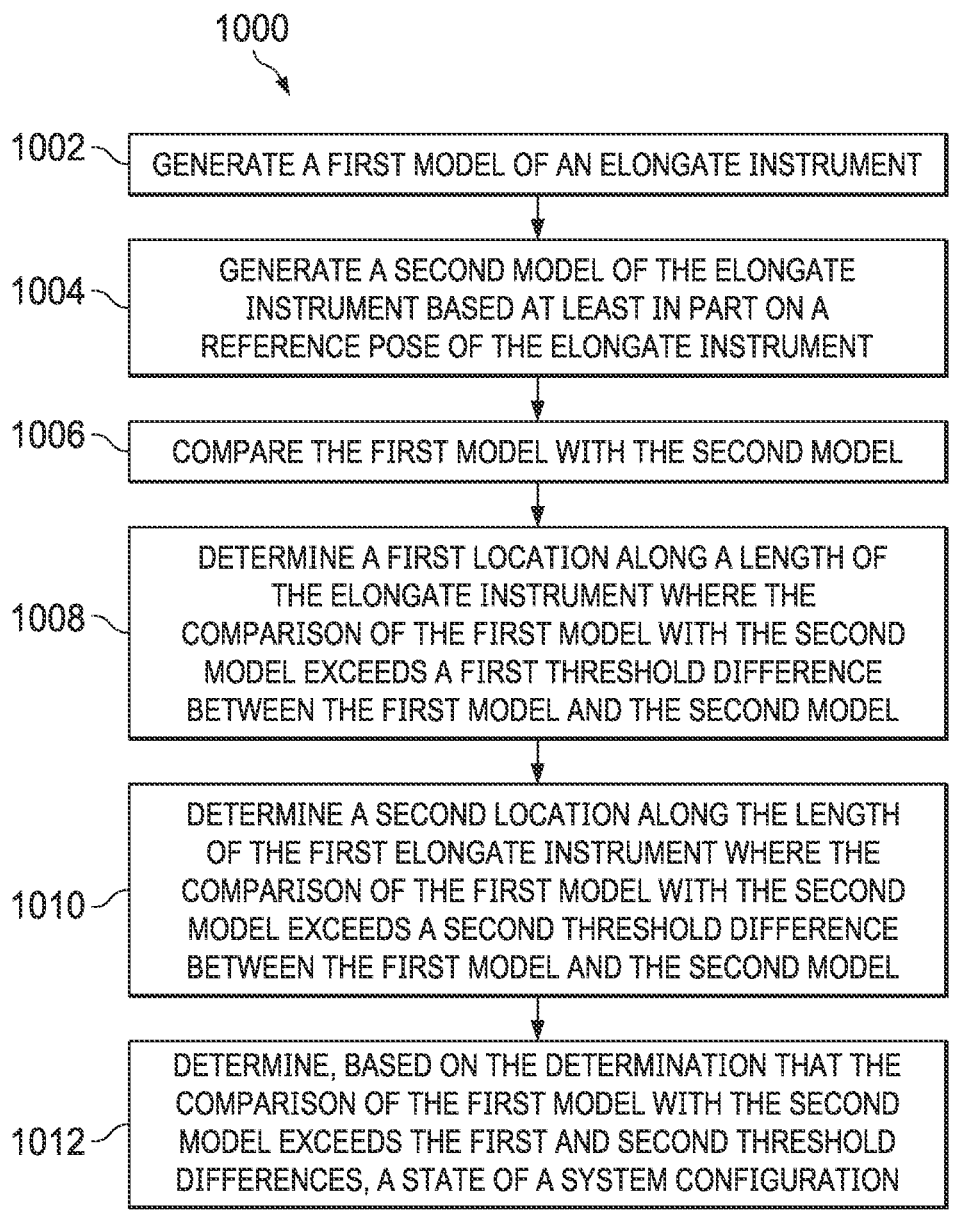
FIG. 10 is a flowchart of a method for determining buckling of a medical instrument by monitoring a location of deviation and a direction of deviation between a measured model of the medical instrument and a predicted model of the medical instrument during a medical procedure according to some embodiments.

FIG. 10 is a flowchart of a method 1000 for determining buckling of an elongate instrument (e.g., the medical instrument 104) by monitoring both a location of deviation and a direction of deviation between a first model (e.g., the measured model 512 in FIG. 5A) and a second model (e.g., the predicted model 500 in FIG. 5A) during a medical procedure according to some embodiments. At a process 1002, the first model of the elongate instrument is generated. At a process 1004, the second model of the elongate instrument based at least in part on a reference pose of the elongate instrument is generated. At a process 1006, the control system 112 compares the first model with the second model. The processes 1002, 1004, and 1006 are substantially similar to the processes 402, 404, and 406 respectively, discussed above with respect to FIG. 4A, and the discussion of the processes 402, 404, and 406 analogously applies to the processes 1002, 1004, and 1006.

At a process 1008, the control system 112 determines a first location along a length of the elongate instrument where the comparison of the first model with the second model exceeds a first threshold difference between the first model and the second model. At a process 1010, the control system 112 determines a second location along the length of the elongate instrument where the comparison of the first model with the second model exceeds a second threshold difference between the first model and the second model. As discussed above, in some embodiments, the measured model 512 may deviate from the predicted model 500 in a radial direction at a portion of the medical instrument 104 and in an axial direction at a portion of the medical instrument 104. As further discussed above, in some examples, the first threshold difference may be measured in a radial direction from the longitudinal axis of the predicted model. The radial direction may be generally perpendicular to the longitudinal axis of the predicted model or measured model. In some examples, the second threshold difference may be measured in an axial direction along the longitudinal axis of the predicted model. The axial direction may be generally parallel to the longitudinal axis of the predicted model. In the example illustrated in FIG. 5A, the first location along the medical instrument 104 which corresponds to where the comparison of the measured model 512 with the predicted model 500 exceeds the first threshold difference between the measured model 512 and the predicted model 500 may be a distal portion of the medical instrument 104. The second location along the medical instrument 104 which corresponds to where the comparison of the measured model 512 with the predicted model 500 exceeds the second threshold difference between the measured model 512 and the predicted model 500 may be a proximal portion of the medical instrument 104.

In alternative embodiments, the measured model 512 may deviate from the predicted model 500 in an axial direction at the proximal portion of the medical instrument 104 and in a radial direction at the distal portion of the medical instrument 104. In alternative examples, the first threshold difference may be measured in an axial direction along the longitudinal axis of the predicted model 500. In such examples, the second threshold difference may be measured in a radial direction from the longitudinal axis of the predicted model 500. In several alternative embodiments, the first location of the medical instrument 104 where the comparison of the measured model 512 with the predicted model 500 exceeds the first threshold difference between the measured model 512 and the predicted model 500 may be a proximal portion of the medical instrument 104. In further embodiments, the second location of the medical instrument 104 where the comparison of the measured model 512 with the predicted model 500 exceeds the second threshold difference between the measured model 512 and the predicted model 500 may be a distal portion of the medical instrument 104.

As discussed above, the control system 112 may determine whether any identified deviations between the models 512, 500 exceed a threshold difference. The threshold difference may be different depending on the component of the models 512, 500 being compared or the specific portions of the models 512, 500 being compared. The thresholds applied in determining whether the patient P has moved or whether the medical instrument 104 has buckled may be dependent upon the approximate location of the medical instrument 104 relative to the work site or environment surrounding the medical instrument 104. For example, the threshold for a deviation in the area of the trachea may be different than the threshold for a deviation in the area that is inside or likely to be inside the lungs. The threshold may also be different depending on the task being performed or the required level of accuracy. For example, the threshold may be set to be more stringent if the medical instrument 104 is being used to access to a particular small region, if the target area is close to a sensitive body structure such as a vessel or the pleura, or if the nature of the tasks (for example ablation) requires more accuracy. The control system 112 may include such information and utilize it during comparison and determination operations.

The comparison of the models 512, 500 may exceed the first threshold difference at a first time. The comparison of the models 512, 500 may exceed the second threshold difference at a second time. In some embodiments, the first time may occur before the second time. In alternative embodiments, the first time may occur after the second time. In still other embodiments, the first time and the second time may be generally the same time.

At a process 1012, the control system 112 determines a state of a system configuration based on the determination that the comparison between the first model and the second model exceeds the first and second threshold differences. In some embodiments, when the comparison of the measured model 512 with the predicted model 500 exceeds the first threshold difference between the models 512, 500 at the first location, and when the comparison of the measured model 512 with the predicted model 500 exceeds the second threshold difference between the models 512, 500 at the second location, the state of the system configuration includes a buckled state of the medical instrument 104. In other words, when the models 512, 500 exceed a threshold in the radial direction at a distal portion of the medical instrument 104 and exceed a threshold in the axial direction at a proximal portion of the medical instrument 104, the state of the system configuration includes a buckled state of the medical instrument 104.

In other embodiments, when the models 512, 500 exceed a threshold in the radial direction at the distal portion and the proximal portion of the medical instrument 104, the state of the system configuration may include a moved state of the patient P. In still further embodiments, when the models 512, 500 exceed a threshold in the axial direction at the distal portion and the proximal portion of the medical instrument 104, the state of the system configuration may include a moved state of the patient P.

As discussed above with respect to FIG. 4A, as a result of the process 1008, 1010, and/or 1012, the control system 112 may take an action such as issuing an alert to an operator via the display system 110 and/or by altering control of the medical instrument 104.

Figure 12A:
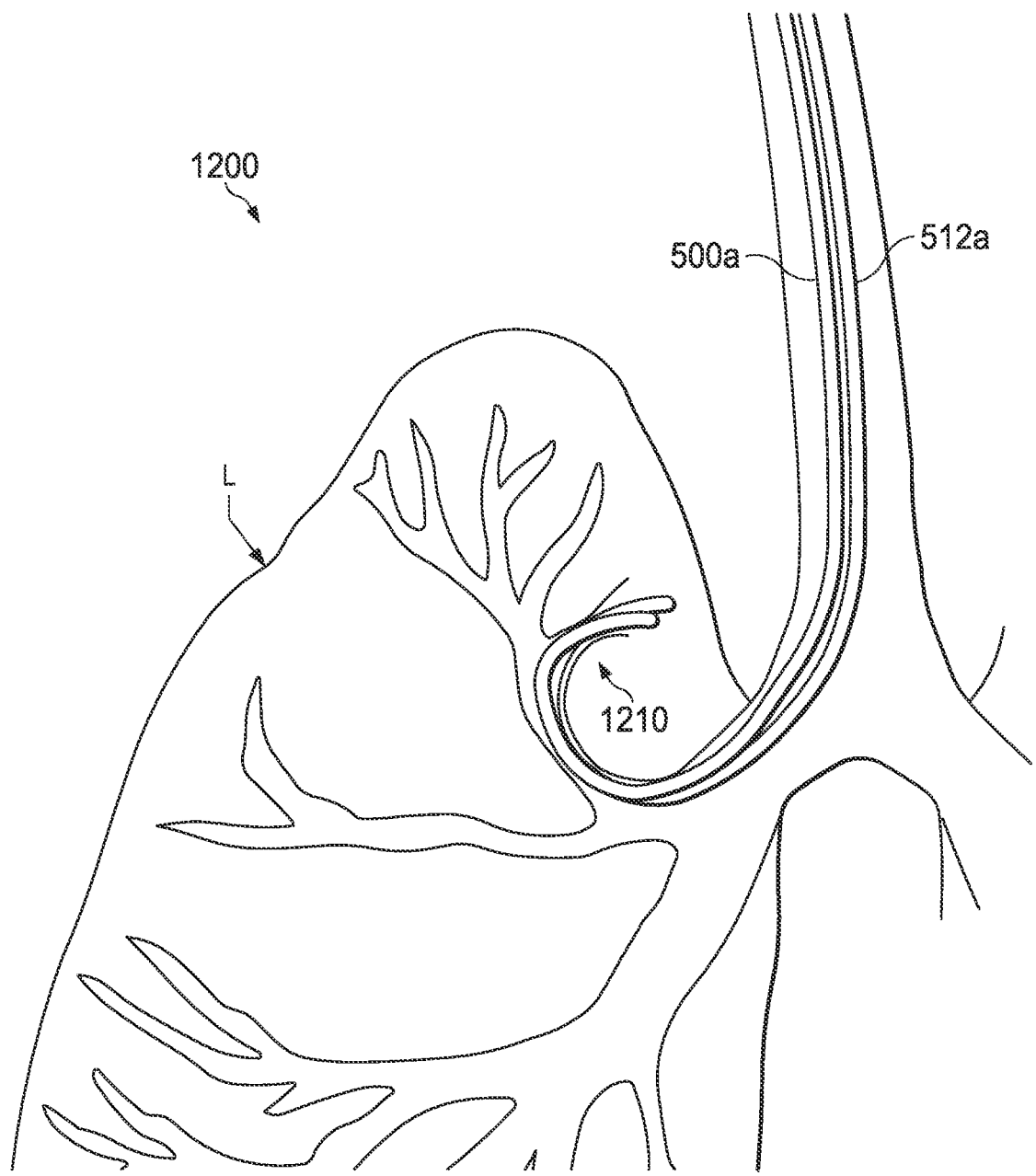
FIGS. 12A and 12B illustrate representations of measured and predicted models of a medical instrument that may be compared to determine buckling of the medical instrument according to some embodiments.
Figure 12B:
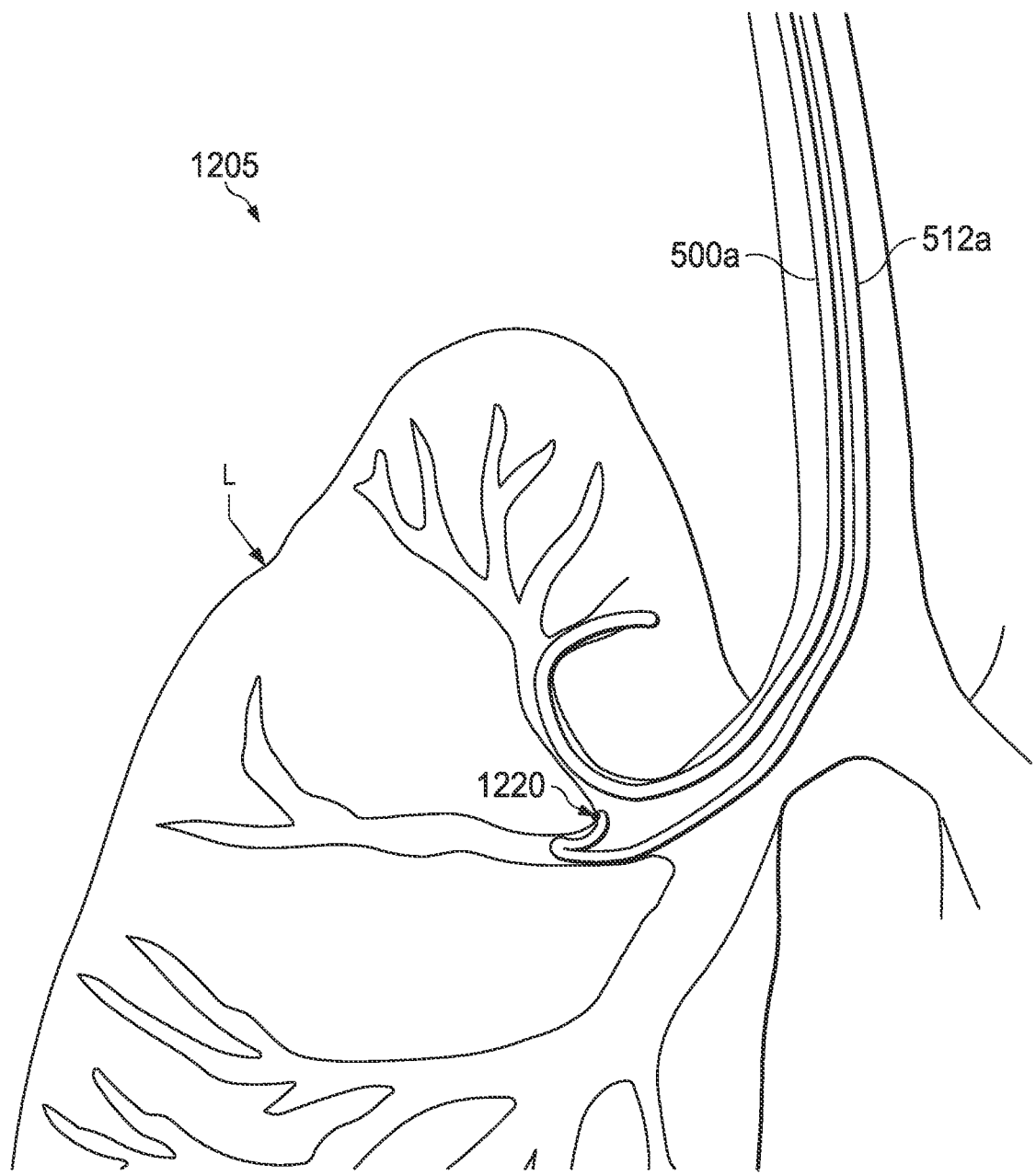

FIGS. 12A and 12B illustrate representations of a measured model 512a and a predicted model 500a of the medical instrument that may be compared to determine buckling of the medical instrument according to some embodiments. In these representations, the predicted model 500a and the measured model 512a are shown in the context of a lung L.

Figure 11:
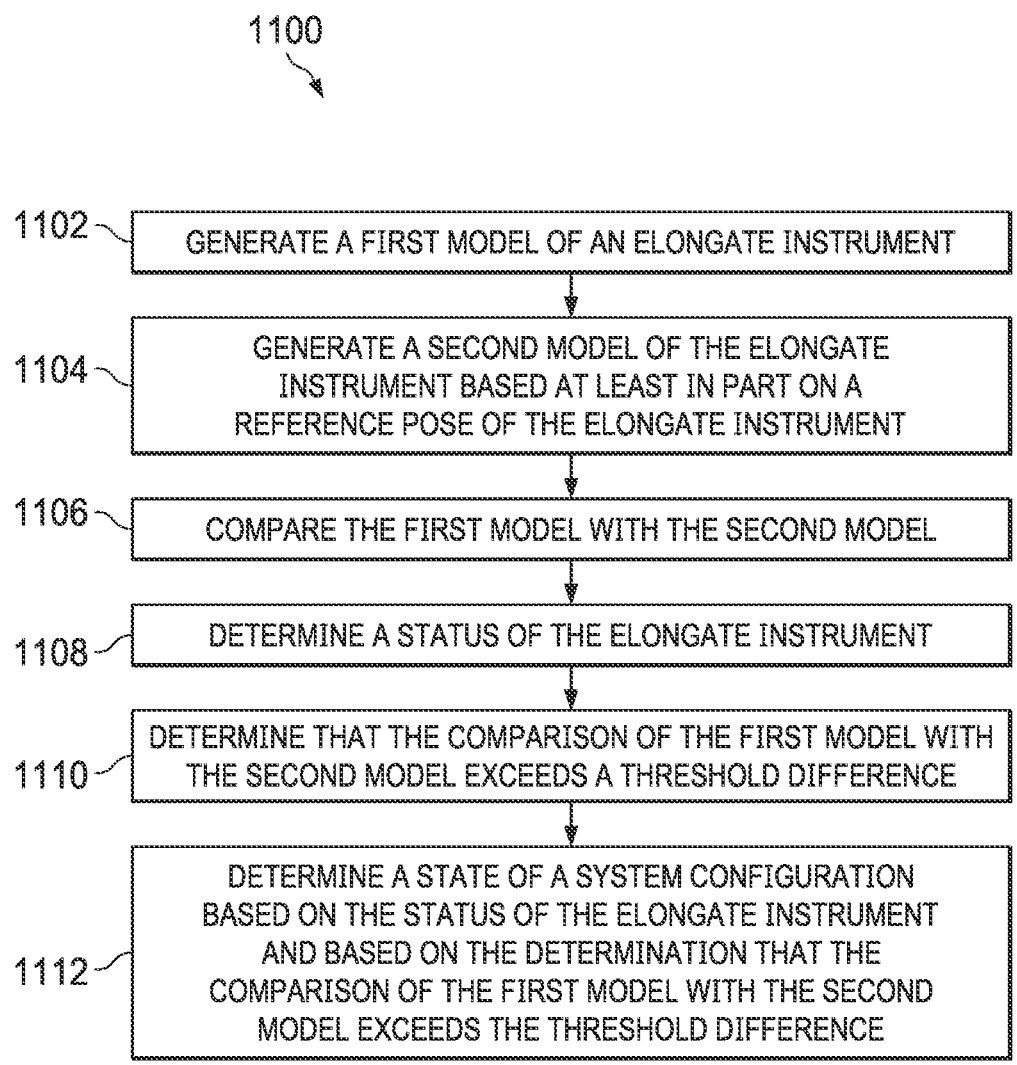
FIG. 11 is a flowchart of a method for determining buckling of a medical instrument by monitoring a status of the medical instrument during a medical procedure according to some embodiments.

FIG. 11 is a flowchart of a method 1100 for determining buckling of an elongate instrument (e.g., the medical instrument 104) by monitoring a status of the medical instrument 104 during a medical procedure according to some embodiments. At a process 1102, a first model (e.g., the measured model 512a) of the elongate instrument is generated. At a process 1104, a second model (e.g., the predicted model 500a) of the elongate instrument based at least in part on a reference pose of the elongate instrument is generated. At a process 1106, the control system 112 compares the first model with the second model. The processes 1102, 1104, and 1106 are substantially similar to the processes 402, 404, and 406 respectively, discussed above with respect to FIG. 4A, and the discussion of the processes 402, 404, and 406 analogously applies to the processes 1102, 1104, and 1106.

At a process 1108, the control system 112 determines a status of the elongate instrument. In some embodiments, the status of the medical instrument 104 may include the medical instrument 104 being in a bended shape (which may include a tight bend (see FIG. 12A)). In some embodiments, the control system 112 identifies the presence and shape of the tight bend. The tight bend may be identified at least in part by using the tracking system 230 to track the shape sensor 222, which may be aligned with the medical instrument 104. The tight bend may also be identified at least in part by analyzing a preoperative model of the patient anatomy. For example, information from the tracking system 230 may be sent to the navigation system 232 and combined with information from the image processing system 231 and/or preoperatively obtained model(s) to provide the operator with real-time position information of the medical instrument 104. In other embodiments, the status of the medical instrument 104 may include a distal end of the medical instrument 104 contacting a portion of the patient anatomy in the axial direction (see FIG. 12B). The status of the medical instrument 104 may include any other configuration that would more likely cause the medical instrument 104 to buckle (which may be referred to as buckle-prone configurations).

Referring again to FIGS. 12A and 12B, FIG. 12A illustrates a representation 1200 of the measured model 512a and the predicted model 500a when the medical instrument 104 is in a tight bend 1210 in a patient anatomy according to some embodiments. As shown in FIG. 12A, the measured model 512a deviates from the predicted model 500a in the tight bend 1210 of the patient anatomy. FIG. 12B illustrates a representation 1205 of the measured model 512a and the predicted model 500a with a distal end 1220 of the medical instrument 104 contacting a portion of the patient anatomy according to some embodiments. As shown in FIG. 12B, the measured model 512a deviates from the predicted model 500a near the area where the distal end 1220 of the medical instrument 104 contacts the patient anatomy. The distal end 1220 may be substantially similar to the distal end 218 (FIGS. 2A and 2B).

Returning to FIG. 11, at a process 1110, the control system 112 determines that the comparison of the first model with the second model exceeds a threshold difference. At a process 1112, the control system 112 determines a state of a system configuration based on the status of the elongate instrument and based on the determination that the comparison of the first model with the second model exceeds the threshold difference. In some embodiments, when the status of the medical instrument 104 indicates that the medical instrument 104 is in a buckle-prone configuration (which may include one or more of the configurations discussed above) and when the measured model 512a exceeds the threshold of the predicted model 500a, the state of the system configuration may include a buckled state of the medical instrument 104. This is because any deviation between the measured model 512a and the predicted model 500a while the medical instrument 104 is in a buckle-prone configuration is more likely due to instrument buckling than patient motion. In some embodiments, determining that the measured model 512a deviates from (e.g., exceeds a threshold of) the predicted model 500a while the medical instrument 104 is in a buckle-prone configuration is a factor that weighs in favor of a determination that the deviation can be attributed to instrument buckling.

As discussed above with respect to FIG. 4A, as a result of the process 1110 and/or 1112, the control system 112 may take an action such as issuing an alert to an operator via the display system 110 and/or by altering control of the medical instrument 104.

Each of the methods 400, 600a, 700, 800, 900, 1000, and 1100 discussed above is illustrated as a set of operations or processes. Not all of the illustrated processes may be performed in all embodiments of the methods 400, 600a, 700, 800, 900, 1000, and 1200. Additionally, one or more processes that are not expressly illustrated in FIGS. 4A, 4B, 6A, 7, 8, 9, 10, and 11 may be included before, after, in between, or as part of the processes illustrated in FIGS. 4A, 4B, 6A, 7, 8, 9, 10, and 11. In some embodiments, one or more of the processes may be implemented, at least in part, in the form of executable code stored on non-transitory, tangible, machine-readable media that when run by one or more processors (e.g., the processors of a control system) may cause the one or more processors to perform one or more of the processes. In one or more embodiments, the processes may be performed by a control system (e.g., control system 112).

One or more elements in embodiments of this disclosure may be implemented in software to execute on a processor of a computer system such as control processing system. When implemented in software, the elements of the embodiments of the invention are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In one embodiment, the control system supports wireless communication protocols such as Bluetooth, IrDA, HomeRF, IEEE 802.11, DECT, and Wireless Telemetry.

Medical tools that may be delivered through the flexible elongate devices or catheters disclosed herein may include, for example, image capture probes, biopsy instruments, laser ablation fibers, and/or other surgical, diagnostic, or therapeutic tools. Medical tools may include end effectors having a single working member such as a scalpel, a blunt blade, an optical fiber, an electrode, and/or the like. Other end effectors may include, for example, forceps, graspers, scissors, clip appliers, and/or the like. Other end effectors may further include electrically activated end effectors such as electrosurgical electrodes, transducers, sensors, and/or the like. Medical tools may include image capture probes that include a stereoscopic or monoscopic camera for capturing images (including video images). Medical tools may additionally house cables, linkages, or other actuation controls (not shown) that extend between its proximal and distal ends to controllably bend the distal end of the instrument. Steerable instruments are described in detail in U.S. Pat. No. 7,416, 681 (filed on Oct. 4, 2005) (disclosing "Articulated Surgical Instrument for Performing Minimally Invasive Surgery with Enhanced Dexterity and Sensitivity") and U.S. patent application Ser. No. 12/286,644 (filed Sep. 30, 2008) (disclosing "Passive Preload and Capstan Drive for Surgical Instruments"), which are incorporated by reference herein in their entireties.

The systems described herein may be suited for navigation and treatment of anatomic tissues, via natural or surgically created connected passageways, in any of a variety of anatomic systems, including the lung, colon, the intestines, the kidneys and kidney calices, the brain, the heart, the circulatory system including vasculature, and/or the like.

Note that the processes and displays presented may not inherently be related to any particular computer or other apparatus. Various general-purpose systems may be used with programs in accordance with the teachings herein, or it may prove convenient to construct a more specialized apparatus to perform the operations described. The required structure for a variety of these systems will appear as elements in the claims. In addition, the embodiments of the invention are not described with reference to any particular programming language. It will be appreciated that a variety of programming languages may be used to implement the teachings of the invention as described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

Various aspects of the subject matter described herein are set forth in the following numbered examples.

Example 1: A medical system comprising: an elongate instrument having a sensor system, wherein the sensor system comprises one or more sensors for measuring a shape of the elongate instrument; and a control system in communication with the sensor system, the control system adapted to: generate a first model of the elongate instrument; generate a second model of the elongate instrument based at least in part on a reference pose of the elongate instrument; compare the first model with the second model; determine a difference between the first model and the second model; characterize the difference between the first model and the second model; and determine a state of a system configuration based on the characterization of the difference between the first model and the second model.

Example 2: The system of example 1, further comprising one or more sensors for measuring insertion of the elongate instrument.

Example 3: The system of example 1, wherein: characterizing the difference between the first model and the second model includes characterizing the difference as a drifting deviation, a non-uniform deviation, or a correlated deviation correlating detection of a deviation with receiving an insertion command; and the state of the system configuration includes a buckled state of the elongate instrument.

Example 4: The system of example 1, wherein characterizing the difference between the first model and the second model includes characterizing the difference as an abrupt deviation or a uniform deviation, and wherein the state of the system configuration includes a moved state of a patient.

Example 5: The system of example 1, wherein characterizing the difference between the first model and the second model includes determining a direction in which the difference exceeds a threshold relative to a longitudinal axis of the elongate instrument.

Example 6: The system of example 5, wherein the state of the system includes a buckled state of the elongate instrument when the direction is generally parallel to the longitudinal axis of the elongate instrument.

Example 7: The system of example 5, wherein the state of the system includes a moved state of a patient when the direction is generally perpendicular to the longitudinal axis of the elongate instrument.

Example 8: The system of example 1, wherein characterizing the difference between the first model and the second model includes determining a location of the difference along a length of the elongate instrument.

Example 9: The system of example 1, wherein the difference between the first model and the second model includes a plurality of deviations, and characterizing the difference includes characterizing each of the plurality of deviations and weighing each of the characterized deviations.

Example 10: The system of example 1, wherein the control system is further adapted to issue an alert based on the determined state of the system configuration.

Example 11: The system of example 10, further comprising a display, wherein issuing the alert comprises displaying a patient motion message on the display.

Example 12: The system of example 10, wherein issuing the alert comprises altering control of the elongate instrument.

Example 13: The system of example 1, wherein the control system is further adapted to prevent insertion movement of the elongate instrument based on the determined state of the system configuration.

Example 14: A medical system comprising: an elongate instrument; and a control system adapted to: generate a first model of the elongate instrument; generate a second model of the elongate instrument based at least in part on a reference pose of the elongate instrument; compare the first model with the second model; determine a first time when the comparison of the first model with the second model indicates a deviation from the second model; determine a second time when the comparison of the first model with the second model meets or exceeds a threshold difference between the first model and the second model; determine a measured time interval between the first time and the second time; and determine, based on the measured time interval, a state of a system configuration.

Example 15: The system of example 14, wherein when the measured time interval is shorter than a first threshold time interval, the state of the system configuration includes a moved state of a patient.

Example 16: The system of example 14, wherein when the measured time interval is greater than a first threshold time interval, the state of the system configuration includes a buckled state of the elongate instrument.

Example 17: The system of example 14, wherein an expected model is based on the second model.

Example 18: The system of example 14, wherein the second model is adapted from a configuration of the first model after the first time.

Example 19: The system of example 14, wherein the control system is further adapted to issue an alert based on the determined state of the system configuration.

Example 20: The system of example 19, wherein issuing the alert comprises displaying a patient motion message on a display.

Example 21: The system of example 19, wherein issuing the alert comprises altering control of the elongate instrument.

Example 22: The system of example 14, wherein the control system is further adapted to prevent insertion movement of the elongate instrument based on the determined state of the system configuration.

Example 23: A medical system comprising: an elongate instrument; and a control system adapted to: generate a first model of the elongate instrument; generate a second model of the elongate instrument based at least in part on a reference pose of the elongate instrument; detect that the first model differs from the second model by at least a threshold difference; correlate the detected difference between the first model and the second model with a received insertion command; and determine, based on the correlation, a state of a system configuration.

Example 24: The system of example 23, wherein the control system is further adapted to insert the elongate instrument from a first insertion distance to a second insertion distance as a result of the received insertion command.

Example 25: The system of example 24, wherein the state of the system configuration includes a buckled state of the elongate instrument.

Example 26: The system of example 23, wherein the control system is further adapted to issue an alert based on the determined state of the system configuration.

Example 27: The system of example 26, wherein issuing the alert comprises displaying a patient motion message on a display.

Example 28: The system of example 26, wherein issuing the alert comprises altering control of the elongate instrument.

Example 29: The system of example 23, wherein the control system is further adapted to prevent insertion movement of the elongate instrument based on the determined state of the system configuration.

Example 30: A medical system comprising: an elongate instrument; and a control system adapted to: generate a first model of the elongate instrument; generate a second model of the elongate instrument based at least in part on a reference pose of the elongate instrument; compare the first model with the second model; determine that the comparison of the first model with the second model exceeds a threshold difference along a portion of the elongate instrument; and determine a state of a system configuration based on a location of the portion of the elongate instrument along a length of the elongate instrument.

Example 31: The system of example 30, wherein the state of the system configuration includes a buckled state of the elongate instrument when the location of the portion of the elongate instrument where the comparison of the first model with the second model exceeds the threshold difference between the first model and the second model is at a distal portion of the elongate instrument.

Example 32: The system of example 30, wherein the state of the system configuration includes a moved state of a patient when the location of the portion of the elongate instrument where the comparison of the first model with the second model exceeds the threshold difference between the first model and the second model is at a proximal portion of the elongate instrument.

Example 33: A medical system comprising: an elongate instrument; and a control system adapted to: generate a first model of the elongate instrument; generate a second model of the elongate instrument based at least in part on a reference pose of the elongate instrument; determine a difference between the first model and the second model and that the difference exceeds a threshold; characterize a direction of the difference between the first model and the second model where the difference exceeds the threshold; and determine a state of a system configuration based on the characterized direction.

Example 34: The system of example 33, wherein characterizing the direction of the difference includes determining that the difference exceeds the threshold in a direction generally parallel to a longitudinal axis of the elongate instrument.

Example 35: The system of example 34, wherein the state of the system configuration includes a buckled state of the elongate instrument when the difference exceeds the threshold in the direction generally parallel to the longitudinal axis of the elongate instrument.

Example 36: The system of example 33, wherein characterizing the direction of the difference includes determining that the difference exceeds the threshold in a direction generally perpendicular to a longitudinal axis of the elongate instrument.

Example 37: The system of example 36, wherein the state of the system configuration includes a moved state of a patient when the difference exceeds the threshold in the direction generally perpendicular to a longitudinal axis of the elongate instrument.

Example 38: A medical system comprising: an elongate instrument; and a control system adapted to: generate a first model of the elongate instrument; generate a second model of the elongate instrument based at least in part on a reference pose of the elongate instrument; compare the first model with the second model; determine a first location along a length of the elongate instrument where the comparison of the first model with the second model exceeds a first threshold difference between the first model and the second model; determine a second location along the length of the elongate instrument where the comparison of the first model with the second model exceeds a second threshold difference between the first model and the second model; and determine, based on the determination that the comparison of the first model with the second model exceeds the first and second threshold differences, a state of a system configuration.

Example 39: The system of example 38, wherein the state of the system configuration includes a buckled state of the elongate instrument when the first threshold difference is measured in a different direction than the second threshold difference.

Example 40: The system of example 39, wherein the first threshold difference is measured in a direction generally perpendicular to a longitudinal axis of the elongate instrument.

Example 41: The system of example 39, wherein the second threshold difference is measured in a direction generally parallel to a longitudinal axis of the elongate instrument.

Example 42: The system of example 39, wherein the first location is distal to the second location.

Example 43: The system of example 38, wherein the state of the system configuration includes a buckled state of the elongate instrument when the comparison of the first model with the second model at the first location exceeds a first threshold difference at a first time and the comparison of the first model with the second model at the second location exceeds a second threshold difference at a second time.

Example 44: The system of example 43, wherein the first location is distal to the second location.

Example 45: The system of example 44, wherein the first location is at a distal portion of the elongate instrument, and the second location is at a proximal portion of the elongate instrument.

Example 46: The system of example 43, wherein the first threshold difference is measured in a direction generally perpendicular to a longitudinal axis of the elongate instrument, and the second threshold difference is measured in a direction generally parallel to a longitudinal axis of the elongate instrument.

Example 47: The system of example 43, wherein the first time occurs before the second time.

Example 48: A medical system comprising: an elongate instrument; and a control system adapted to: generate a first model of the elongate instrument; generate a second model of the elongate instrument based at least in part on a reference pose of the elongate instrument; compare the first model with the second model; determine a status of the elongate instrument; determine that the comparison of the first model with the second model exceeds a threshold difference; and determine a state of a system configuration based on the status of the elongate instrument and based on the determination that the comparison of the first model with the second model exceeds the threshold difference.

Example 49: The system of example 48, wherein determining the status of the elongate instrument includes determining that the elongate instrument is in a bended shape.

Example 50: The system of example 49, wherein when the elongate instrument is in a bended shape, the state of the system configuration includes a buckled state of the elongate instrument.

Example 51: The system of example 48, wherein determining the status of the elongate instrument includes determining that a distal end of the elongate instrument is contacting a portion of a patient anatomy.

Example 52: The system of example 51, wherein when the distal end of the elongate instrument is contacting the portion of the patient anatomy, the state of the system configuration includes a buckled state of the elongate instrument.

Example 53: The system of example 48, wherein the control system is further adapted to issue an alert based on the determined state of the system configuration.

Example 54: The system of example 53, wherein issuing the alert comprises displaying a patient motion message on a display.

Example 55: The system of example 53, wherein issuing the alert comprises altering control of the elongate instrument.

Example 56: The system of example 48, wherein the control system is further adapted to prevent insertion movement of the elongate instrument based on the determined state of the system configuration.

What is claimed is:

1. A medical system comprising:
    an elongate instrument; and
    a control system adapted to:
        generate a first model of the elongate instrument;
        generate a second model of the elongate instrument based at least in part on a reference pose of the elongate instrument;
        compare the first model with the second model;
        determine a difference between the first model and the second model;
        characterize the difference between the first model and the second model; and
        based on the characterization of the difference between the first model and the second model:
            determine whether the difference is a result of instrument buckling within a patient anatomy; and
            determine whether the difference is a result of movement of a patient.

2. The system of claim 1, wherein the control system is further adapted to determine that the difference exceeds a threshold.

3. The system of claim 1, wherein characterizing the difference between the first model and the second model comprises characterizing the difference as a drifting deviation, and wherein when the difference is characterized as a drifting deviation, the difference is a result of instrument buckling within the patient anatomy.

4. The system of claim 1, wherein characterizing the difference between the first model and the second model comprises characterizing the difference as an abrupt deviation, and wherein when the difference is characterized as an abrupt deviation, the different is a result of movement of the patient.

5. The system of claim 1, wherein characterizing the difference between the first model and the second model comprises characterizing the difference as a non-uniform deviation along a length of the elongate instrument.

6. The system of claim 5, wherein when the difference is characterized as a non-uniform deviation, the difference is a result of instrument buckling within the patient anatomy.

7. The system of claim 1, wherein characterizing the difference between the first model and the second model comprises correlating a detection of the difference between the first model and the second model with receiving an insertion command.

8. The system of claim 7, wherein when characterizing the difference includes correlating the detection of the difference with receiving the insertion command, the difference is a result of instrument buckling within the patient anatomy.

9. The system of claim 1, wherein characterizing the difference between the first model and the second model comprises characterizing the difference as a uniform deviation along a length of the elongate instrument.

10. The system of claim 9, wherein when the difference is characterized as a uniform deviation, the difference is a result of movement of the patient.

11. The system of claim 1, wherein characterizing the difference between the first model and the second model comprises determining that the difference exceeds a threshold in a direction generally parallel to a longitudinal axis of the elongate instrument.

12. The system of claim 11, wherein when the difference exceeds the threshold in the direction generally parallel to the longitudinal axis of the elongate instrument, the difference is a result of instrument buckling within the patient anatomy.

13. The system of claim 1, wherein characterizing the difference between the first model and the second model comprises determining that the difference exceeds a threshold in a direction generally perpendicular to a longitudinal axis of the elongate instrument.

14. The system of claim 13, wherein when the difference exceeds the threshold in the direction generally perpendicular to the longitudinal axis of the elongate instrument, the difference is a result of movement of the patient.

15. The system of claim 1, wherein characterizing the difference between the first model and the second model comprises determining that the difference exceeds a threshold at a proximal portion of the elongate instrument.

16. The system of claim 15, wherein when the difference exceeds the threshold at the proximal portion of the elongate instrument, the difference is a result of instrument buckling within the patient anatomy.

17. The system of claim 1, wherein characterizing the difference between the first model and the second model comprises determining that the difference exceeds a threshold at a distal portion of the elongate instrument.

18. The system of claim 17, wherein when the difference exceeds the threshold at the distal portion of the elongate instrument, the difference is a result of movement of the patient.

19. The system of claim 1, wherein characterizing the difference between the first model and the second model comprises:
    determining that a first deviation exceeds a first threshold at a first portion of the elongate instrument; and determining that a second deviation exceeds a second threshold at a second portion of the elongate instrument, wherein the second portion is proximal to the first portion.

20. The system of claim 19, wherein the first deviation exceeds the first threshold in a direction generally parallel to a longitudinal axis of the elongate instrument, and the second deviation exceeds the second threshold in a direction generally perpendicular to the longitudinal axis of the elongate instrument, and wherein based on the characterization, the difference is a result of instrument buckling within the patient anatomy.

* * * * *